United States Patent
Bae et al.

(10) Patent No.: US 9,821,259 B2
(45) Date of Patent: Nov. 21, 2017

(54) AIR CLEANER

(71) Applicant: LG ELECTRONICS INC., Seoul (KR)

(72) Inventors: Soohyun Bae, Seoul (KR); Hyunpil Ha, Seoul (KR); Soonki Jung, Seoul (KR); Yeongcheol Mun, Seoul (KR); Jaekyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/364,467

(22) Filed: Nov. 30, 2016

(65) Prior Publication Data
US 2017/0246580 A1 Aug. 31, 2017

(30) Foreign Application Priority Data

Feb. 26, 2016 (KR) .................. 10-2016-0023663
Jun. 13, 2016 (KR) .................. 10-2016-0073083
Oct. 25, 2016 (KR) .................. 10-2016-0139376

(51) Int. Cl.
*B01D 46/00* (2006.01)
*B01D 46/24* (2006.01)
*B01D 46/42* (2006.01)
*F24F 1/02* (2011.01)

(52) U.S. Cl.
CPC ..... *B01D 46/0047* (2013.01); *B01D 46/0008* (2013.01); *B01D 46/0019* (2013.01); *B01D 46/0086* (2013.01); *B01D 46/24* (2013.01); *B01D 46/42* (2013.01); *F24F 1/02* (2013.01)

(58) Field of Classification Search
CPC combination set(s) only.
See application file for complete search history.

(56) References Cited

U.S. PATENT DOCUMENTS

| | | | |
|---|---|---|---|
| 4,365,980 A | 12/1982 | Culbert et al. | |
| 5,117,652 A * | 6/1992 | Takeuchi | F24F 1/025 62/291 |
| 5,264,015 A | 11/1993 | Matsui | |
| 5,334,248 A | 8/1994 | Kwak | |
| 5,641,343 A | 6/1997 | Frey | |

(Continued)

FOREIGN PATENT DOCUMENTS

| CN | 102661295 | 12/2014 |
|---|---|---|
| CN | 204141826 | 2/2015 |

(Continued)

OTHER PUBLICATIONS

U.S. Office Action dated Jan. 20, 2017 issued in U.S. Appl. No. 15/363,156.

(Continued)

*Primary Examiner* — Robert Clemente
(74) *Attorney, Agent, or Firm* — Ked & Associates LLP

(57) ABSTRACT

An air cleaner is provided that may include a first air cleaning module having a first fan that generates air flow from a first suction inlet toward a first discharge outlet; a second air cleaning module having a second fan that generates air flow from a second suction inlet toward a second discharge outlet; a dividing plate provided between the first air cleaning module and the second air cleaning module; and a display provided at inside of the dividing plate and in which a light source is provided.

18 Claims, 20 Drawing Sheets

(56) References Cited

U.S. PATENT DOCUMENTS

| | | | |
|---|---|---|---|
| 5,753,000 | A | 5/1998 | Chiu et al. |
| 6,494,940 | B1 * | 12/2002 | Hak ............... A61L 9/16 55/471 |
| 8,212,146 | B1 * | 7/2012 | Moore ............ H01R 13/447 174/66 |
| 2006/0107834 | A1 | 5/2006 | Vandenbelt et al. |
| 2006/0201119 | A1 | 9/2006 | Song |
| 2006/0277875 | A1 | 12/2006 | Schuld |
| 2007/0137489 | A1 | 6/2007 | Luo |
| 2007/0221061 | A1 * | 9/2007 | Steiner ............. B03C 3/32 96/63 |
| 2010/0225012 | A1 * | 9/2010 | Fitton .............. F24F 1/01 261/116 |
| 2011/0308210 | A1 * | 12/2011 | Crabtree ......... B01D 46/0005 55/483 |
| 2013/0055692 | A1 | 3/2013 | Cecchi et al. |
| 2014/0216259 | A1 | 8/2014 | Iwaki |
| 2015/0306533 | A1 * | 10/2015 | Matlin ............ B01D 46/448 96/420 |
| 2016/0184753 | A1 * | 6/2016 | Chu ............... B01D 46/002 96/74 |

FOREIGN PATENT DOCUMENTS

| | | |
|---|---|---|
| CN | 104603545 | 5/2015 |
| DE | 9312051 | 10/1993 |
| EP | 1 950 500 | 7/2008 |
| EP | 2 072 920 | 6/2009 |
| EP | 2 476 968 | 7/2012 |
| EP | 2 837 597 | 2/2015 |
| EP | 2 853 835 | 4/2015 |
| GB | 2 345 005 | 6/2000 |
| GB | 2516058 | 1/2015 |
| JP | H06-50180 | 6/1994 |
| JP | 2000-354724 | 12/2000 |
| JP | 2006-022977 | 1/2006 |
| JP | 2007-105578 | 4/2007 |
| JP | 2012-120720 | 6/2012 |
| JP | 2013-217580 | 10/2013 |
| JP | 2014-507277 | 3/2014 |
| JP | 2014-119224 | 6/2014 |
| JP | 2015-080737 | 4/2015 |
| JP | 2015-108497 | 6/2015 |
| JP | 5740503 | 6/2015 |
| KR | 20-1993-0002444 | 5/1993 |
| KR | 10-0139487 | 6/1998 |
| KR | 20-0173274 | 3/2000 |
| KR | 20-0289687 | 9/2002 |
| KR | 20-0342073 | 2/2004 |
| KR | 10-2004-0056151 | 6/2004 |
| KR | 10-2004-0108462 | 12/2004 |
| KR | 10-0508312 | 8/2005 |
| KR | 10-2005-0115343 | 12/2005 |
| KR | 10-2006-0023457 | 3/2006 |
| KR | 10-2009-0058446 | 6/2009 |
| KR | 10-2010-0056797 | 5/2010 |
| KR | 10-2010-0062121 | 6/2010 |
| KR | 10-2010-0070069 | 6/2010 |
| KR | 10-2012-0060279 | 6/2012 |
| KR | 10-2012-0071992 | 7/2012 |
| KR | 10-1168738 | 7/2012 |
| KR | 10-4168738 | 7/2012 |
| KR | 10-2012-0136137 | 12/2012 |
| KR | 10-2013-0036447 | 4/2013 |
| KR | 10-1342606 | 12/2013 |
| KR | 10-2014-0039703 | 4/2014 |
| KR | 10-4385290 | 4/2014 |
| KR | 10-2014-0092953 | 7/2014 |
| KR | 10-2014-0094414 | 7/2014 |
| KR | 10-2015-0005594 | 1/2015 |
| KR | 10-1500501 | 3/2015 |
| KR | 10-1516365 | 5/2015 |
| KR | 10-4516365 | 5/2015 |
| KR | 10-2016-0012796 | 2/2016 |
| KR | 10-2016-0015084 | 2/2016 |
| KR | 10-2016-0017587 | 2/2016 |
| KR | 10-1599634 | 3/2016 |
| KR | 10-2016-0048499 | 5/2016 |
| KR | 10-2016-0053649 | 5/2016 |
| WO | WO 2010/109944 | 9/2010 |

OTHER PUBLICATIONS

U.S. Office Action dated Jan. 20, 2017 issued in U.S. Appl. No. 15/364,369.
U.S. Office Action dated Jan. 23, 2017 issued in U.S. Appl. No. 15/363,204.
U.S. Office Action dated Jan. 23, 2017 issued in U.S. Appl. No. 15/364,410.
U.S. Office Action dated Feb. 10, 2017 issued in co-pending U.S. Appl. No. 15/363,111.
U.S. Appl. No. 15/363,411, filed Nov. 29, 2016.
U.S. Appl. No. 15/363,456, filed Nov. 29, 2016.
Korean Office Action dated Jan. 26, 2017 issued in Application No. 10-2016-0073055.
Korean Office Action dated Jan. 26, 2017 issued in Application No. 10-2016-0073083.
Korean Office Action dated Jan. 26, 2017 issued in Application No. 10-2016-0077888.
International Search Report dated Mar. 21, 2017 issued in Application No. PCT/KR2016/013907.
International Search Report dated Mar. 20, 2017 issued in Application No. PCT/KR2016/013906.
International Search Report dated Mar. 30, 2017 issued in Application No. PCT/KR2016/013912.
International Search Report dated Mar. 30, 2017 issued in Application No. PCT/KR2016/013908.
Korean Office Action dated Apr. 20, 2017 issued in Application No. 10-2016-0132790.
European Search Report dated Jun. 21, 2017 issued in Application No. 16201095.3.
European Search Report dated Apr. 25, 2017 issued in Application No. 16201086.2-1602.
European Search Report dated Apr. 25, 2017 issued in Application No. 17157045.0-1602.
Korean Office Action dated Jun. 21, 2017 (10-2017-0056865).
Korean Office Action dated Jun. 21, 2017 (10-2017-0056885).
Korean Office Action dated Jun. 21, 2017 (10-2017-0056886).
U.S. Appl. No. 15/363,111, filed Nov. 29, 2016.
U.S. Appl. No. 15/363,156, filed Nov. 29, 2016.
U.S. Appl. No. 15/659,869, filed Jul. 26, 2017.
U.S. Appl. No. 15/659,878, filed Jul. 26, 2017.
U.S. Appl. No. 15/363,204, filed Nov. 29, 2016.
U.S. Appl. No. 15/660,105, filed Jul. 26, 2017.
U.S. Appl. No. 15/660,122, filed Jul. 26, 2017.
U.S. Appl. No. 15/363,438, filed Nov. 29, 2016.
U.S. Appl. No. 15/363,587, filed Nov. 29, 2016.
U.S. Appl. No. 15/659,989, filed Jul. 26, 2017.
U.S. Appl. No. 15/660,076, filed Jul. 23, 2017.
U.S. Appl. No. 15/660,207, filed Jul. 26, 2017.
U.S. Appl. No. 15/660,287, filed Jul. 26, 2017.
U.S. Appl. No. 15/660,362, filed Jul. 26, 2017.
U.S. Appl. No. 15/660,462, filed Jul. 26, 2017.
U.S. Appl. No. 15/363,643, filed Nov. 29, 2016.
U.S. Appl. No. 15/364,369, filed Nov. 30, 2016.
U.S. Appl. No. 15/364,410, filed Nov. 30, 2016.
U.S. Appl. No. 15/441,957, filed Feb. 24, 2017.
U.S. Office Action issued in U.S. Appl. No. 15/364,369 dated Jul. 14, 2017.
European Search Report dated Jun. 21, 2017 issued in Application No. 16201093.8.
Korean Office Action dated Jun. 21, 2017 issued in Application No. 10-2017-0056789.
Korean Office Action dated Jun. 21, 2017 issued in Application No. 10-2017-0056790.
Korean Office Action dated Jun. 21, 2017 issued in Application No. 10-2017-0056791.

(56) References Cited

OTHER PUBLICATIONS

European Search Report dated Jun. 23, 2017 issued in Application No. 16201089.6.
European Search Report dated Jun. 23, 2017 issued in Application No. 16201088.8.
Korean Office Action dated Jun. 30, 2017 issued in Application No. 10-2017-0056864.
European Search Report dated Jul. 14, 2017 issued in Application No. 16201094.6.
European Search Report dated Jul. 20, 2017 issued in Application No. 162010912.
Korean Notice of Allowance dated Aug. 15, 2017 issued in Application No. 10-2016-0074369.
Korean Office Action dated Aug. 22, 2017 issued in Application No. 10-2016-0073055.
European Search dated Jul. 14, 2017 issued in Application No. 16201092.0.
Korean Office Action dated Aug. 31, 2017 issued in Application No. 10-2016-0073063.

* cited by examiner

AIR CLEANER

CROSS-REFERENCE TO RELATED APPLICATION(S)

The present application claims priority under 35 U.S.C. 119 and 35 U.S.C. 365 to Korean Patent Application No. 10-2016-0073083 filed in Korea on Jun. 13, 2016, No. 10-2016-0023663 filed in Korea on Feb. 26, 2016, and No. 10-2016-0139376 filed in Korea on Oct. 25, 2016, which are hereby incorporated by reference in their entirety.

BACKGROUND

1. Field

An air cleaner is disclosed herein.

2. Background

An air cleaner is a device that suctions in and purifies contaminated air and then discharges purified air. For example, the air cleaner may include a blower that introduces outside air into the air cleaner and a filter capable of filtering dust and bacteria, for example.

Generally, the air cleaner is configured to purify an Indoor space, such as a home or an office. According to the air cleaner in the related art, there is a problem that a capacity thereof is limited, and thus, purification of air in an entire indoor space is limited. Accordingly, air around the air cleaner is purified whereas air in a space away from the air cleaner is not purified.

In order to solve this problem, there are efforts to improve a performance of a fan provided in the air cleaner. However, noise generated by the fan gradually increases as a blowing amount of the fan increases. Accordingly, there is a problem is that reliability of the product is decreased. Finally, there is inconvenience that the air cleaner has to be moved by a user in order to purify air in the desired space.

A related art air cleaner is disclosed in Korean Publication No. KR10-2012-0071992 published on Jul. 3, 2012 and entitled AIR CLEANER, which is hereby incorporated by reference. According to this disclosure, air cleaning components, such as the fan and a filter are installed, in an inside of a case having a substantially rectangular parallelepiped shape of a main body of the air cleaner. Air suction ports are formed on a side portion and a lower portion of the main body of the air cleaner and an air discharge port is formed on an upper portion of the main body thereof.

According to this configuration, there is a problem in that a suction capacity is reduced as the contaminated air is suctioned from a limited direction, that is, from a side direction and a lower direction relative to the air cleaner. A corner portion of the case having a rectangular parallelepiped shape provides structural resistance interfering with the suction of air.

In addition, there is a problem that an air cleaning function is limited as purified air does not flow to a space away from the air cleaner, whereas air around the air cleaner is purified. That is, the air which is purified in the air cleaner is discharged in only one direction, that is, only in an upward direction. Further, there is a problem that a blowing capacity is limited as only one blowing fan is provided in the main body of the air cleaner.

BRIEF DESCRIPTION OF THE DRAWINGS

Embodiments will be described in detail with reference to the following drawings in which like reference numerals refer to like elements, and wherein.

DETAILED DESCRIPTION

Figure 1:
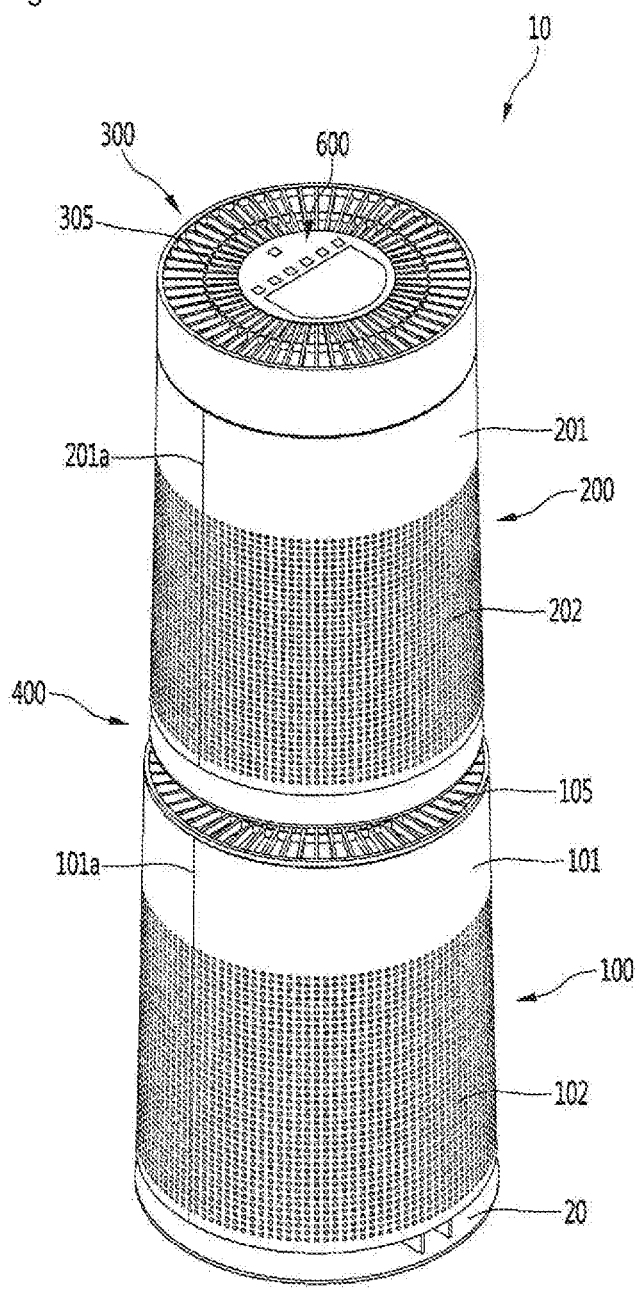
FIG. 1 is a perspective view of an air cleaner according to an embodiment.

Hereinafter, embodiments will be described in detail with reference to the illustrative drawings. Regarding the reference numerals assigned to the components in the drawings, it should be noted that the same components may be designated by the same reference numerals, wherever possible, even though they are shown in different drawings. Also, in the description of embodiments, specific description of known related configuration or functions may be omitted when it is deemed that such description may cause ambiguous interpretation of the present invention.

Also, in the description of embodiments, terms such as first, second, A, B, (a), (b) or the like may be used herein when describing components. Each of these terminologies is not used to define an essence, order or sequence of a corresponding component but used merely to distinguish the corresponding component from other component(s). In a case where it is described that any component is "connected" or "coupled" to another component, the component may be directly or indirectly connected or coupled to another component. However, it is to be understood that another component may be "connected" or "coupled" between the components.

FIG. 1 is a perspective view of an air cleaner according to an embodiment. With reference to FIG. 1, the air cleaner 10 according to this embodiment may include blowing devices or blowers 100 and 200 that generate air flow and a flow adjusting device or adjuster 300 that adjusts a discharge direction of the air flow generated in the blowing devices 100 and 200. The blowing devices 100 and 200 may include a first blowing device 100 that generates a first air flow and a second blowing device 200 that generates a second air flow.

The first blowing device 100 and the second blowing device 200 may be provided in a vertical direction. For example, the second blowing device 200 may be provided on or at an upper side of the first blowing device 100. In this case, the first air flow is a flow of indoor air suctioned from a lower side of the air cleaner 10 and the second air flow is a flow of indoor air suctioned from an upper side of the air cleaner 10.

The air cleaner 10 may include cases 101 and 201 that form an outer appearance thereof. That is, the cases 101 and 201 may include a first case 101 that forms an outer appearance of the first blowing device 100. The first case 101 may have a cylindrical shape. An upper portion of the first case 101 may have a diameter which is less than a diameter of a lower portion thereof. That is, the first case 101 may have a truncated cone shape.

The first blowing device 100 and the second blowing device 200 may be referred to as a "first air cleaning module or cleaner 100" and a "second air cleaning module or cleaner 200", respectively, in that the first blowing device 100 and the second blowing device 200 perform a function of cleaning air in a space to be cleaned. The first blowing device 100 may be referred to as a "lower air cleaning module or cleaner" or "lower module or cleaner" in that the first blowing device 100 is provided at a lower portion of the air cleaner 10 and the second blowing device 200 may be referred to as an "upper air cleaning module or cleaner" or "upper module or cleaner" in that the second blowing device 200 is provided at an upper portion of the air cleaner 10. The flow adjusting device 300 may be referred to as "flow adjusting module or adjuster 300" or "flow control module 300".

The first case 101 may include a first separation portion 101a at which two parts which constitute the first case 101 may be assembled or disassembled. The first case 101 may further include a hinge portion or hinge which is provided on an opposite of the first separation portion 101a. The two parts may be capable of being relatively rotated about the hinge portion.

When at least any one part of the two parts rotates, the first case 101 may be opened and separated from the air cleaner 10. A locking device or lock may be provided at a portion at which the two parts are coupled, that is, a side opposite to the hinge portion. The locking device may include a locking projection or a magnet or coupler. Components of the first blowing device 100 may be replaced or repaired by opening the first case 101.

The first case 101 may include a first suction portion or inlet 102 through which air may be suctioned in a radial direction. The first suction portion 102 may include one or more through hole formed to pass through at least a portion of the first case 101. A plurality of first suction portions 102 may be provided.

The plurality of first suction portions 102 may be evenly provided in a circumferential direction along an outer circumferential surface of the first case 101 so that air suction may be performed in any direction relative to the first case 101. That is, air may be suctioned in 360 degree directions relative to a center line that extends in the vertical direction and passes through an inside center of the first case 101.

Accordingly, a suction amount of air may be increased by the first case 101 having a cylindrical shape and the plurality of first suction portions 102 formed along the outer circumferential surface of the first case 101. Flow resistance to suctioned air may be reduced by avoiding a cube shape having edges or edge portions such as the case of the related art air cleaner.

Air which is suctioned in through the first suction portion 102 may flow substantially in the radial direction from the outer circumferential surface of the first case 101. Directions may be defined as follows. Referring to the FIG. 1, the vertical direction may refer to an axial direction and a transverse direction may refer to the radial direction. The axial direction may correspond to a central axis direction of the first fan 160 and the second fan 260, which are described hereinafter, that is, a motor shaft direction of the fan. The radial direction may refer to a direction which is perpendicular to the axial direction. The circumferential direction may refer to a virtual circle direction which is formed when rotating about the axial direction and having a distance of the radial direction as a rotational radius.

The first blowing device 100 may include a base 20 provided at a lower side of the first case 101 and placed on the ground. The base 20 may be positioned spaced apart from a lower end portion or end of the first case 101 in a downward direction. A base suction portion or inlet 103 may be formed in a space between the first case 101 and the base 20.

Air which is suctioned in through the base suction portion 103 may flow in an upward direction through a suction port 112 of a suction grill 110 (see FIG. 2), which may be provided in or at an upper side of the base 20. That is, the first blowing device 100 may include the plurality of suction portions 102 and the base suction portion 103. Air in a lower portion of the indoor space may be easily introduced to the first blowing device 100 through the plurality of suction portions 102 and the base suction portion 103. Accordingly, the suction amount of air may be increased.

A first discharge portion or outlet 105 may be formed at an upper portion of the first blowing device 100. The first discharge portion 105 may be formed on a first discharge grill 195 of a first discharge guide device or guide 190 (see, FIG. 8) which may be provided in the first blowing device 100. The first discharge guide 190 may form an outer appearance of an upper end portion or end of the first blowing device 100. Air discharged through the first discharge portion 105 may flow to the upper side in the axial direction.

The cases 101 and 201 may include a second case 201 which may form an outer appearance of the second blowing device 200. The second case 201 may have a cylindrical shape. An upper portion of the second case 201 may have a diameter which is less than a diameter of a lower portion thereof. That is, the second case 201 may have a truncated cone shape.

The second case 201 may include two parts and a hinge portion or hinge which are capable of being assembled or being disassembled through a second separation portion 201a. The second case 201 may be openable similar to the first case 101. The second case 201 may be the same or similar to the first case 101, and thus, repetitive disclosure has been omitted. Inner components of the second blowing device 200 may be replaced or repaired by opening the second case 201.

A diameter of a lower end portion of the second case 201 may be less than a diameter of the upper end portion or end of the first case 101. Accordingly, in a general shape of the cases 101 and 201, a lower cross-sectional area of the cases 101 and 102 may be formed to be greater than an upper cross-sectional area. Accordingly, the air cleaner 10 may be stably supported on the ground.

The second case 201 may include a second suction portion or inlet 202 through which air may be suctioned in the radial direction. The second suction portion 202 may include one or more through hole formed to pass through at least a portion of the second case 201. A plurality of the second suction portion 202 may be provided.

The plurality of second suction portions 202 may be evenly provided in the circumferential direction along an outer circumferential surface of the second case 201 so that air suction may be performed in any direction relative to the second case 201. That is, air may be suctioned in 360 degree directions relative to a center line that extends in the vertical direction and passes through an inside center of the second case 201.

Accordingly, a suction amount of air may be increased by the second case 201 having a cylindrical shape and the plurality of second suction portions 202 formed along the outer circumferential surface of the second case 201. Flow resistance to suctioned air may be reduced by avoiding a cube shape having an edge portions such as the case of the related are air cleaner. Air which is suctioned in through the second suction portion 202 may flow substantially in the radial direction from the outer circumferential surface of the second case 201.

The air cleaner 10 may include a dividing device or divider 400 provided between the first blowing device 100 and the second blowing device 200. By the dividing device 400, the second blowing device 200 may be positioned at the upper side of the first blowing device 100 spaced apart therefrom. The dividing device 400 will be described hereinafter, with reference to the drawings.

The flow adjusting device 300 may be provided at an upper side of the second blowing device 100. An air flow path of the second blowing device 100 may communicate with an air flow path of the flow adjusting device 300. The air passing through the second blowing device 100 may be discharged through a second discharge portion or outlet 305 to the outside via the air flow path of the flow adjusting device 300. The second discharge portion 305 may be provided on or at an upper end portion of the flow adjusting device 300.

Figure 19:
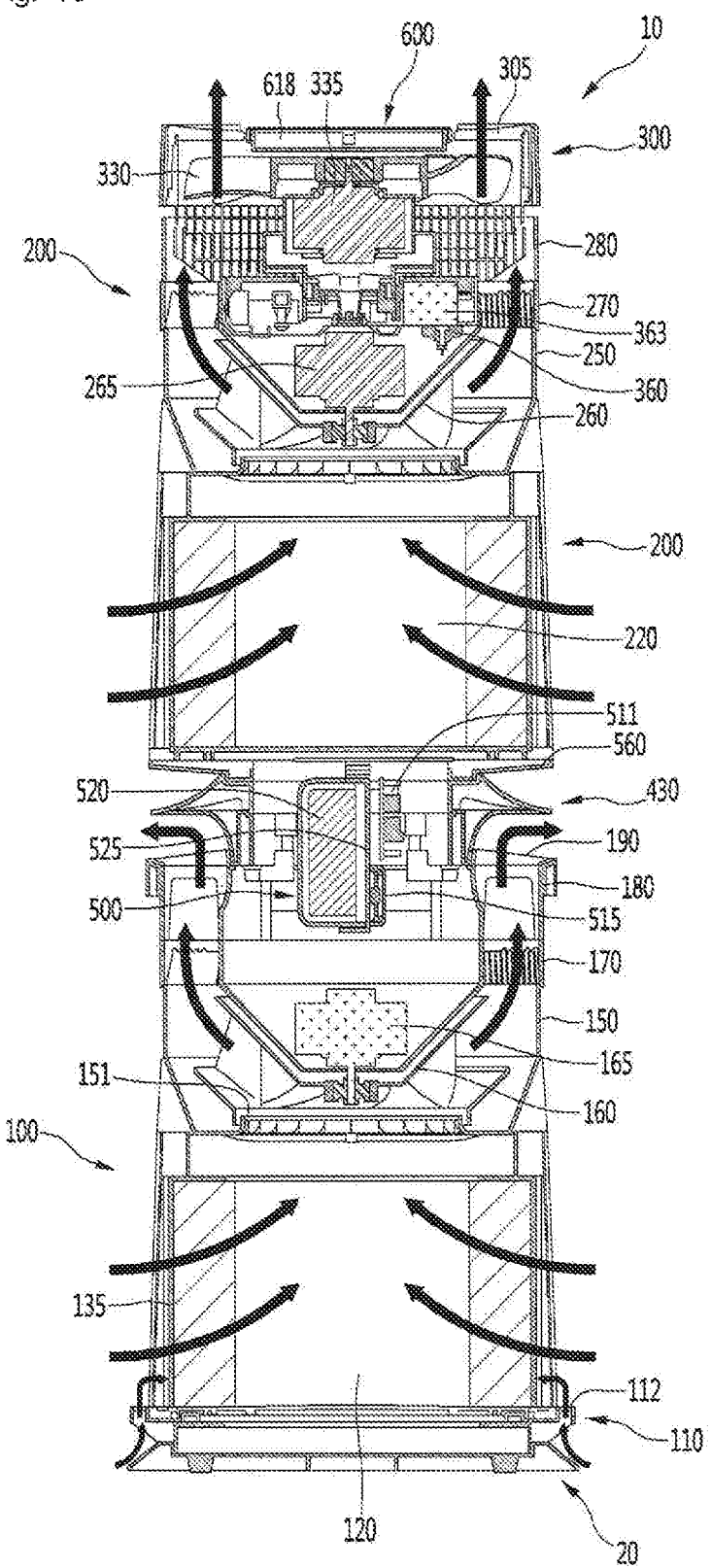
Figure 20:
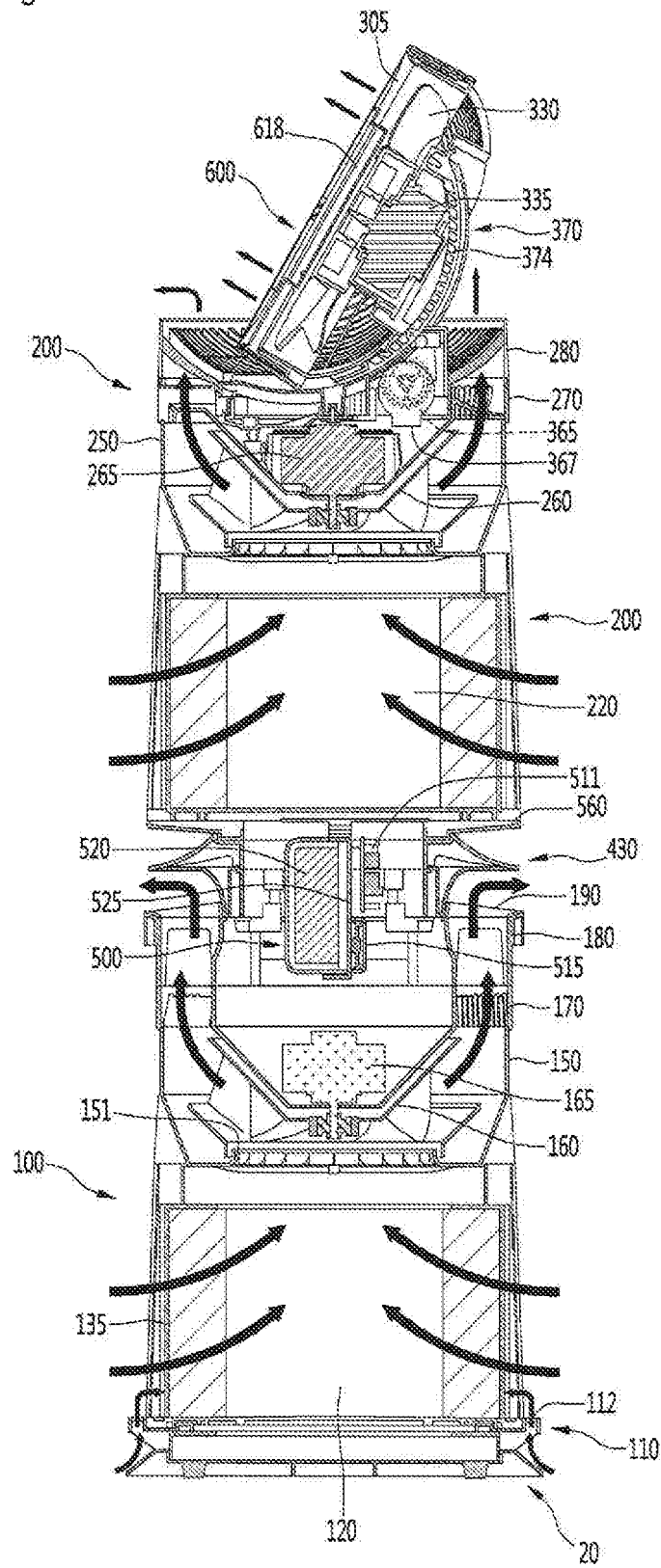

The flow adjusting device 300 may be movable. That is, the flow adjusting device 300 may be movable between a laid-out state (first position), as illustrated in FIG. 1, or an inclined state (second position), as illustrated in FIG. 19 to FIG. 21, as described hereinafter.

A display device 600 that displays operation information of the air cleaner 10 may be provided in or at an upper portion of the flow adjusting device 300. The display device 600 may move along with the flow adjusting device 300.

Figure 2:
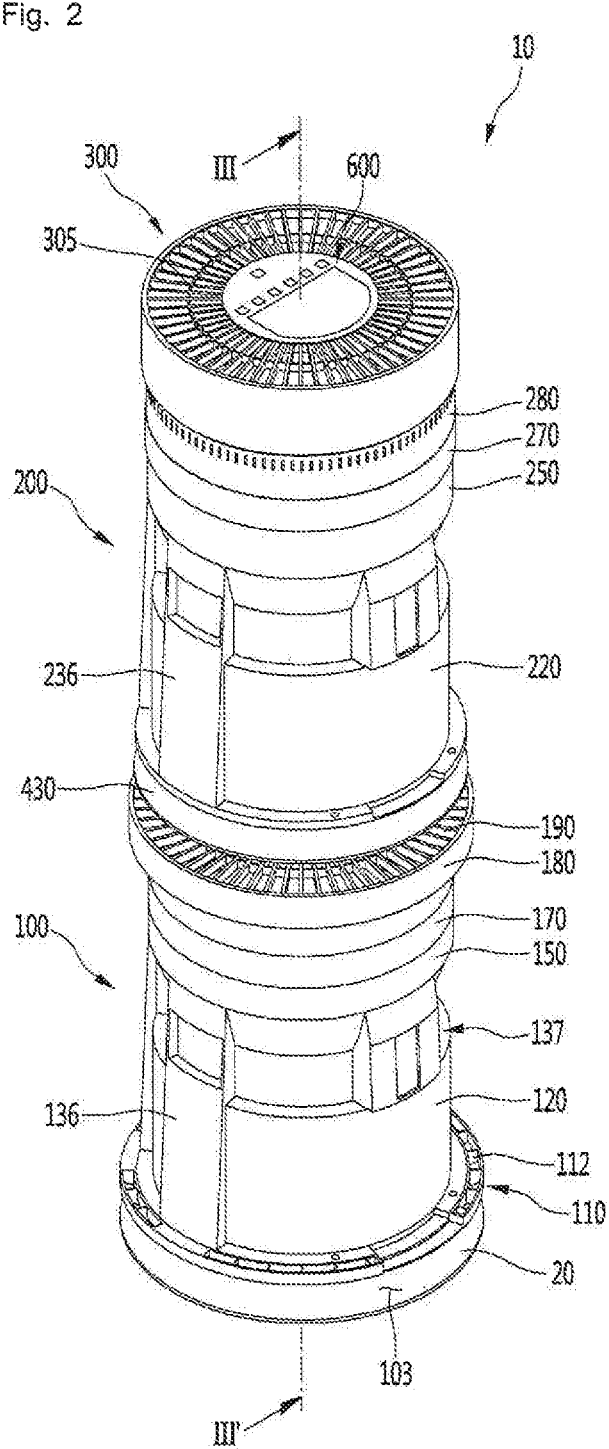
FIG. 2 is a perspective view illustrating an internal configuration of the air cleaner of FIG. 1.
Figure 3:
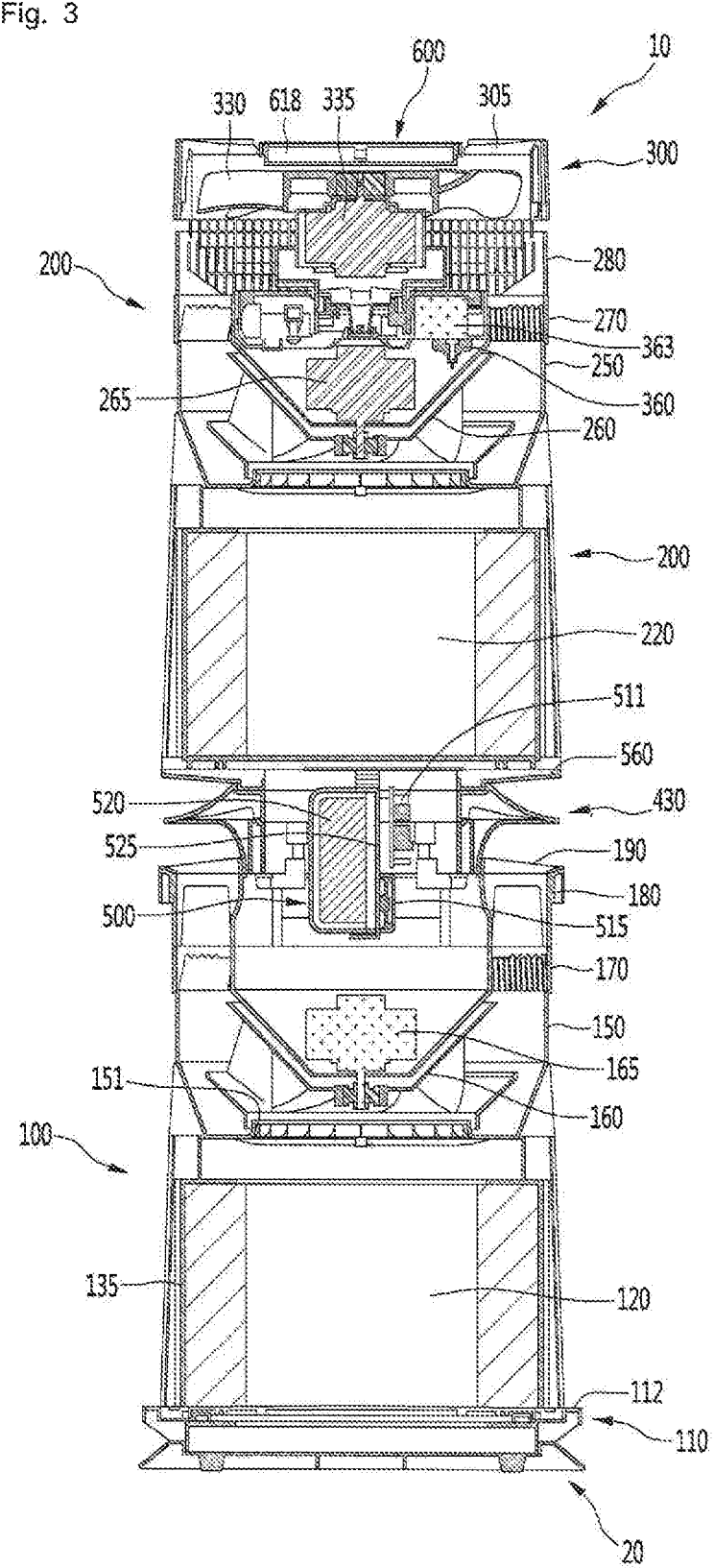
FIG. 3 is a cross-sectional view, taken along line III-III' in FIG. 2.
Figure 4:
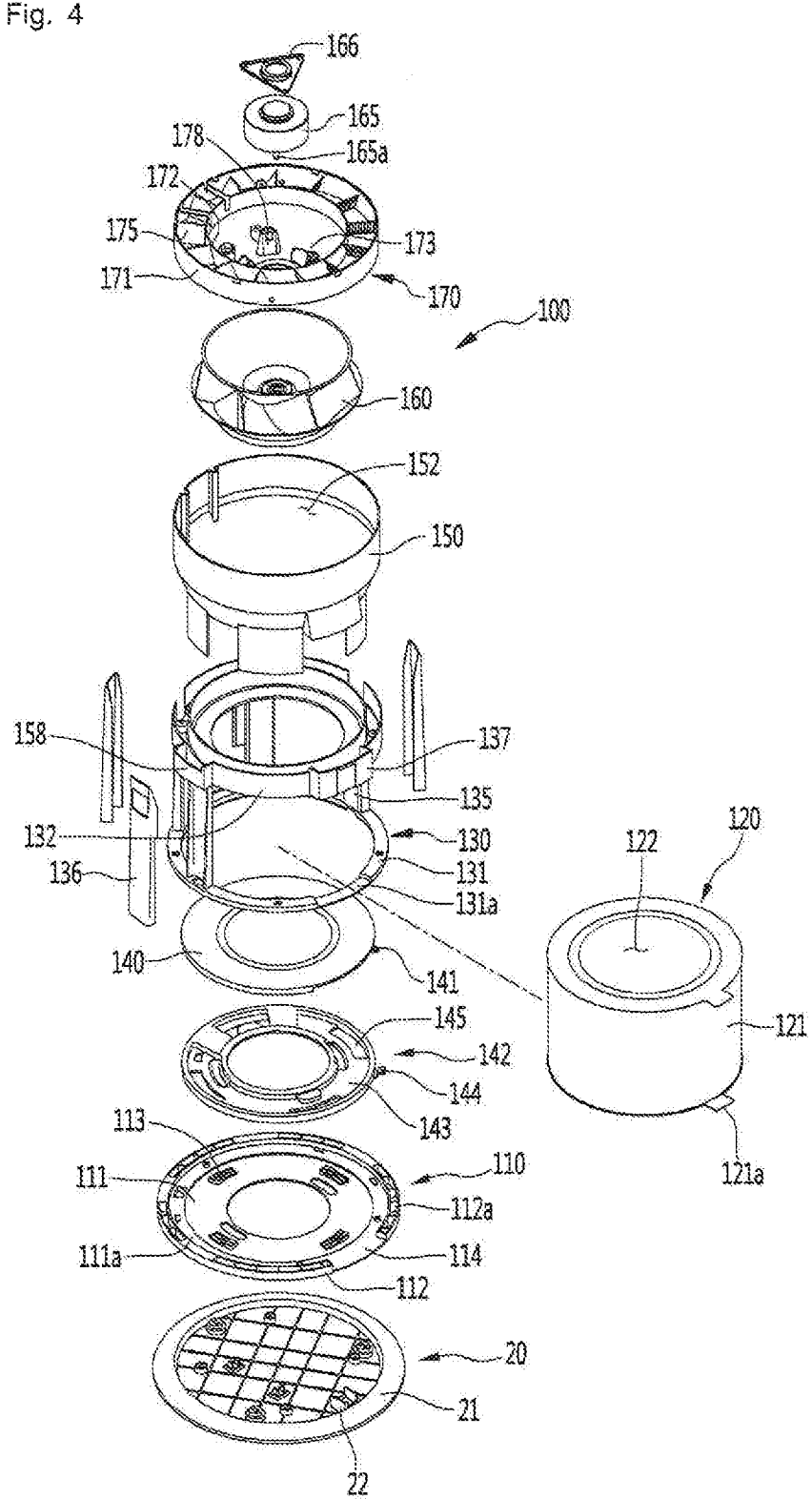
FIG. 4 is an exploded perspective view of a first blowing device of the air cleaner of FIG. 1.
Figure 5:
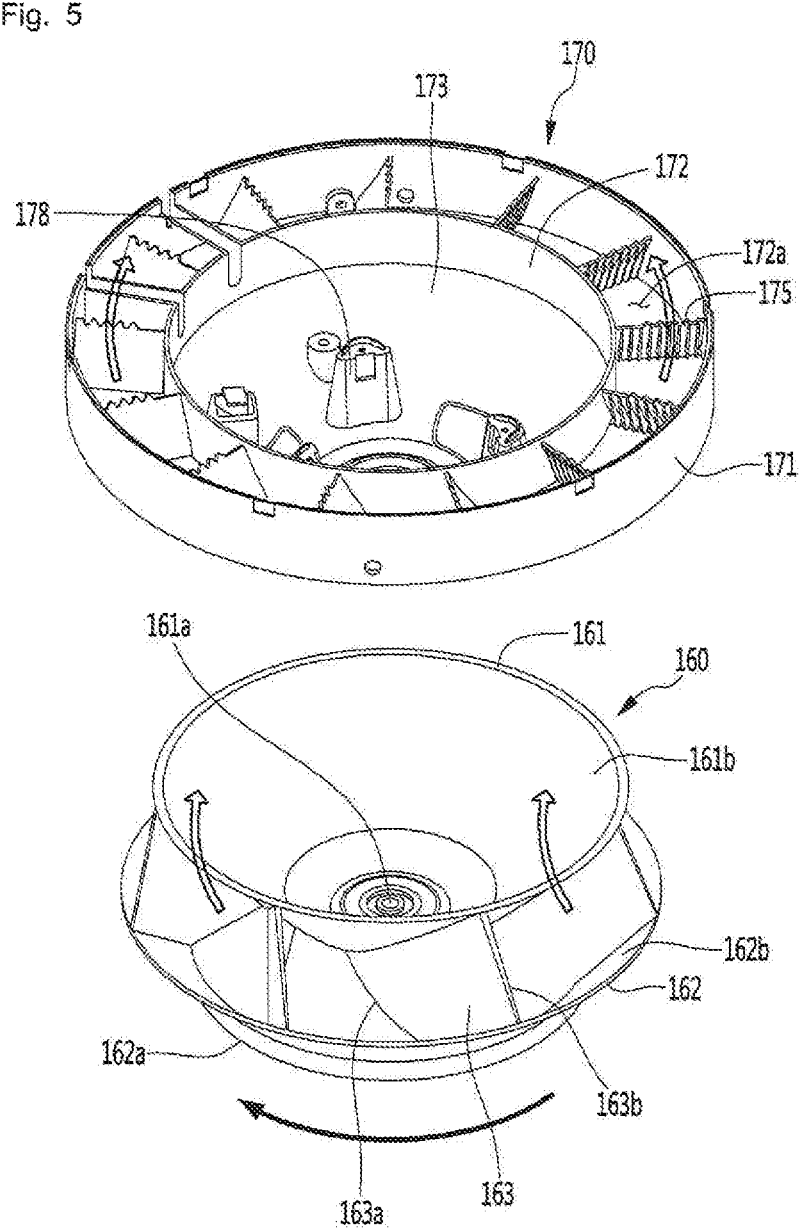
FIG. 5 is an exploded perspective view of a first fan and a first guide of the air cleaner of FIG. 1.
Figure 6:
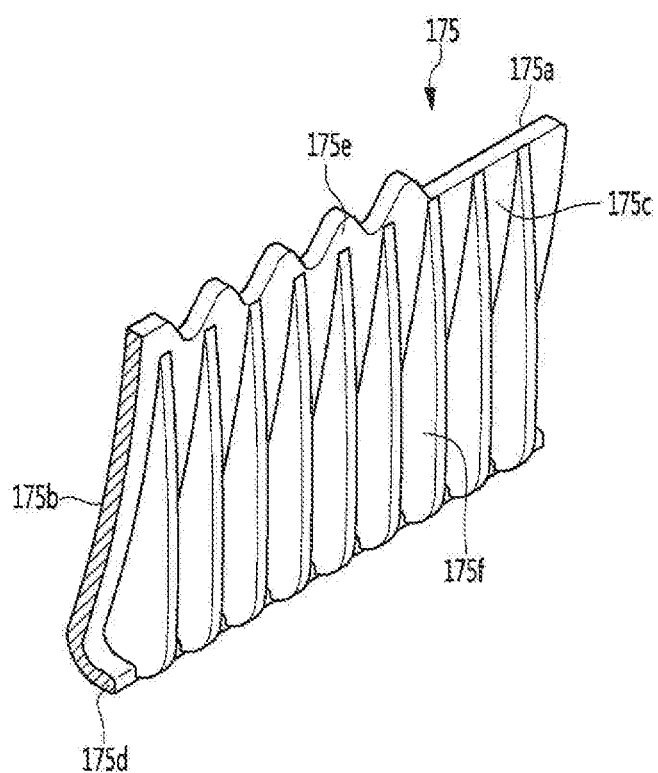
FIG. 6 is a perspective view of a guide rib of the air cleaner of FIG. 1.

FIG. 2 is a perspective view illustrating an internal configuration of the air cleaner of FIG. 1. FIG. 3 is a cross-sectional view, taken along line III-III' in FIG. 2. FIG. 4 is an exploded perspective view of a first blowing device of the air cleaner of FIG. 1. FIG. 5 is an exploded perspective view of a first fan and a first guide device of the air cleaner of FIG. 1. FIG. 6 is a perspective view of a guide rib of the air cleaner of FIG. 1.

With reference to FIG. 2 to FIG. 6, a base 20 and a suction grill 110, which may be disposed on or at an upper side of the base 20, may be included in the first blowing device 100 according to this embodiment. The base 20 may include a base main body 21, which may be placed on the ground, and a base projecting portion or projection 22 that projects from the base main body 21 in the upward direction and on which the suction grill 110 may be placed. The base projecting portion 22 may be provided at both sides of the base 20.

The base main body 21 and the suction grill 110 may be spaced apart from each other by the base projecting portion 22. The base suction portion 103 which forms a suction space of air may be included between the base 20 and the suction grill 110.

The suction grill 110 may include a grill main body 111 having a substantially ring shape and a rim portion or rim 110a that protrudes from an outer circumferential surface of the grill main body 111 in the upward direction. By the configuration of the grill main body 111 and the rim portion 111a, the suction grill 110 may have a stepped structure.

The suction grill 110 may include a suction portion or inlet 112 formed on the rim portion 111a. The suction portion 112 may protrude along a circumference of the rim portion 111a in the upward direction and extend in a circumferential direction. In addition, a plurality of suction holes 112a may be formed in the suction portion 112. The plurality of suction holes 112a may communicate with the base suction portion 103.

Air suctioned in through the plurality of suction holes 112a and the base suction portion 103 may pass through a first filter member or filter 120. The first filter may have a cylindrical shape and a filter surface that filters air. The air passing through the plurality of suction holes 112a may be introduced to an inside portion of the first filter 120 by passing through an outer circumferential surface of the cylindrical first filter 120.

The suction grill 110 may further include a movement guide portion or guide 113 that protrudes from a top surface of the grill main body 111 in the upward direction to guide movement of the first filter 120 in the upward or downward direction. The movement guide 113 may be configured to have a shape further protruding in the circumferential direction from the top surface of the grill main body 111. That is, the movement guide 113 may have an inclined surface that protrudes in the circumferential direction.

A plurality of movement guides 113 may be provided to be spaced apart from each other in the circumferential direction. For example, as shown in FIG. 4, four movement guides 113 may be provided. However, a number of the movement guides 113 is not limited thereto.

The grill main body 111 may further include a groove portion or groove 114 which provides a space in which a handle 144 described hereinafter may be movable. The groove 113 form at least a portion of the grill main body 111, and may be a portion at which the suction portion 112 is not formed in the rim portion of the grill main body 111.

The first blowing device 100 may include a lever device or lever 142, which may be provided on or at an upper side of the suction grill 110 and which may be operable by a user. The lever device 142 may be rotatable in the circumferential direction.

The lever device 142 may include a lever main body 143, which may have a substantially ring shape and be rotatable. In addition, a plurality of cut-out portions or cut-outs disposed or provided at positions corresponding to the plurality of movement guides 113 may be formed in the lever main body 143. The plurality of cut-out portions 145 may be through holes formed in the lever main body 143.

The plurality of cut-out portions 145 may be arranged in the circumferential direction of the lever main body 143 spaced apart from each other. In addition, each of the cut-out portions 145 may be rounded with a predetermined curvature in the circumferential direction, corresponding to the curvature of an outer circumferential surface of the lever main body 143.

The lever device 142 may be supported on the upper surface of the grill main body 111. If the lever device 142 is supported by the grill main body 111, the plurality of movement guides 113 may be inserted into the plurality of cut-out portions 145. The plurality of movement guides 113 may protrude from the plurality of cut-out portions 145 in the upward direction by passing through the plurality of cut-out portions 145.

A length of each of the cut-out portions 145 may be formed longer than a length of the movement guide 113. Thus, the lever device 142 may rotate in a state in which the movement guide 113 is inserted into the cut-out portion 145. In addition, one end portion or end of the movement guide 113 may interfere with one end portion or end of the cut-out portion 145 in a process in which the lever device 142 rotates in one direction, and the other end portion or end of the movement guide 113 may interfere with the other end portion or end of the cut-out portion 145. A second handle 144 may be provided at the outer circumferential surface of the lever main body 143.

A supporting device 140 that supports the first filter 120 may be provided on an upper side of the lever device 142. The supporting device 140 may include a first handle 141 coupled to the second handle 144. A user may grasp the first and second handles 141 and 144 and then rotates the lever main body 143 and the supporting device 140 in a clockwise direction or in a counterclockwise direction.

The lever device 142 may support a lower surface of the supporting device 140. A support projecting portion or projection (not shown), which may be in contact with the movement guide 113, may be provided on the supporting device 140. The support projecting portion may protrude downward from the lower surface of the supporting device 140, and may be provided at a position corresponding to the movement guide 113. In addition, a shape of the support projecting portion may correspond to a shape of the movement guide 113, and the support projecting portion may include an inclined surface formed to further protrude in the circumferential direction.

A direction in which the movement guide 113 gradually projects and a direction in which the support projecting portion gradually projects may be opposite to each other. For example, when the direction in which the movement guide 113 gradually projects is the counterclockwise direction, the direction in which the support projecting portion gradually projects may be clockwise direction.

The support projecting portion may be disposed or provided at a position corresponding to the cut-out portion 145. That is, the movement guide 113 and the support projecting portion may be disposed or provided at a position at which they are inserted into the cut-out portion 145.

The lever device 142 and the supporting device 140 may rotate together. In the rotation process, the movement guide 113 and the support projecting portion may interfere with each other. If a lower portion of the support projecting portion and an upper portion of the movement guide 113 are in contact with each other, the lever device 142 and the supporting device 140 may be lifted in the upward direction. In addition, the first filter 120 supported by the supporting device 140 may be in a state in which the first filter 120 is coupled to the first blowing device 100 while moving in the upward direction.

On the other hand, if the lower portion of the support projecting portion and the upper portion of the movement guide 113 are in contact with each other or if inference between the support projecting portion and the movement guide 113 is released, the lever device 142 and the supporting device 140 may move downward. In addition, the first filter 120 supported by the supporting device 140 may be in a state (released state) in which the first filter 120 is separable from the first blowing device 100.

The first filter 120 may have a cylindrical shape having an open upper portion. The first filter 120 may include a filter main body 121, which may have a cylindrical filter, an inside of which may be empty, and a filter hole 122 formed to be open at an upper end portion or end of the filter main body 121. A filter grasping portion or grasp 121a may be provided at an upper or lower portion of the filter main body 121. Air may be introduced to the inside of the filter main body 121 through an outer circumferential surface of the film main body 121, and may be discharged from the first filter 120 through the filter hole 122.

The first blowing device 100 may further include a first filter frame 130, which may form a mounting space for the first filter 120. More specifically, the first filter frame 130 may include a first frame 131, which may form a lower portion of the first filter frame 130 and a second frame 132, which may form an upper portion of the first filter frame 130.

The first frame 131 may include a frame depression portion or depression 131a having a downwardly depressed shape. The frame depression portion 131 may be configured such that at least a portion of the first frame 131 is depressed. The frame depression portion 131a may be formed at a position corresponding to the groove portion 114 of the suction grill 110. The groove portion 114 and the frame depression portion 131a may provide a space portion or space in which the first and second handles 141 and 144 may be movable. The first and second handles 141 and 144 may be located in the space portion, to rotate in the clockwise direction or in the counterclockwise direction.

The second frame 132 may be spaced apart from the first frame 131 in the upward direction. The second frame 132 may have a substantially ring shape. The ring-shaped inside portion space of the second frame 132 may form at least a portion of an air flow path passing through the first filter frame 130. In addition, an upper portion of the second frame 132 may support a first fan housing 150 described hereinafter.

The first filter frame 130 may further include a first filter supporting portion or support 135 that extends from the first frame 131 to the second frame 132 in the upward direction. The first frame 131 and the second frame 132 may be spaced apart from each other by the first filter supporting portion 135. A plurality of first filter supporting portions 135 may be provided and the plurality of the first filter supporting portions 135 may be arranged in the circumferential direction, and thus, may be connected to rim portions or rims of the first frame 131 and the second frame 132. A mounting space of the first filter 120 may be defined by the plurality of first fitter supporting portions 135 and the first frame 131 and the second frame 132.

A sensor device or sensor 137 may be installed or provided in or on the first filter frame 130. The sensor device 137 may include a dust sensor that senses an amount of dust in the air and a gas sensor that senses an amount of gas in the air. The dust sensor and the gas sensor may be disposed or provided to be supported by the second frame 132 of the first filter frame 130.

The first filter 120 may be detachably mounted in the mounting space. The first filter 120 may have a cylindrical shape and air may be introduced through the outer circumferential surface of the first filter 120. Impurities, such as fine dust in air, may be filtered in a process of passing through the first filter 120.

The air may be introduced from any direction relative to the first filter 120, by the first filter 120 having the cylindrical shape. Accordingly, a filtering area of air may be increased.

The mounting space may have a cylindrical shape corresponding to the shape of the first filter 120. The first filter 120 may be slidably introduced toward the mounting space in a mounting process. In contrast, the first filter 120 may be slidably withdrawn from the mounting space in a separating process.

That is, when the first and second handles 141 and 144 are operated in a state in which the first filter 120 is located on the upper surface of the supporting device 140, the first filter 120 may be in a released position with the first filter 120 being moved in the downward direction. The first filter 120 may be slid to the outside in the radial direction and may be separated from the mounting space.

In contrast, when separated from the mounting space the first filter 120 may be slid toward the mounting space to the inside in the radial direction, supported on the upper surface of the supporting device 140, and thus, may be in close contact upwardly by an operation of the first and second handles 141 and 144. At this time, the first filter 120 is in a coupling position. A first supporting portion cover 136 may be coupled with the outside of the first filter supporting portion 135.

The first blowing device 100 may further include a first fan housing 150, which may be installed or provided on or at an outlet side of the first filter 120. A housing space portion or space 152, in which a first fan 160 may be accommodated, may be formed in the first fan housing 150. In addition, the first fan housing 150 may be supported by the first filter frame 130.

A first fan introducing portion 151 that guides introduction of air to an inside of the first fan housing 150 may be included in a lower portion of the first fan housing 150, A grill may be provided in or on the first fan introducing portion 151 to prevent, for example, a finger of a user from being put into the inside of the first fan housing 150 when the first filter 150 is separated.

The first blowing device 100 may further include an ionizer 158 that removes or sterilizes smell particles in the air. The ionizer 158 may be coupled to the first fan housing 150 and be capable of acting on the air which flows inside of the first fan housing 150.

The sensor device 137 and the ionizer 158 may also be installed or provided in a second blowing device 200 described hereinafter. For example, the sensor device 137 and the ionizer 158 may be installed or provided in one of the first blowing device 100 or the second blowing device 200.

The first fan 160 may be located on or at an the upper side of the first fan introducing portion 151. For example, the first fan 160 may include a centrifugal fan that introduces air in the axial direction and then discharges air to the upper side in the radial direction.

The first fan 160 may include a hub 161 to which a rotational shaft 165*a* of a first fan motor 165, which may be a centrifugal fan motor, may be coupled, a shroud 162 which may be disposed or provided in a state of being spaced apart from the hub 161, and a plurality of blades 163, which may be disposed or provided between the hub 161 and the shroud 162. The first fan motor 165 may be coupled to the upper side of the first fan 160.

The hub 161 may have a bowl shape, a diameter of which may be gradually reduced in the downward direction. The hub 161 may include a shaft coupling portion to which the rotational shaft 165*a* may be coupled and a first blade coupling portion that extends at an incline from the shaft coupling portion in the upward direction.

The shroud 162 may include a lower end portion or lower end, on or at which a shroud suction port 162*a*, into which air having passed through the first fan introducing portion 151 may be suctioned, may be formed and a second blade coupling portion that extends from the lower end portion in the upward direction.

A first surface of each blade 163 may be coupled to the first blade coupling portion of the hub 161 and a second surface thereof may be coupled to the second blade coupling portion of the shroud 162. The plurality of blades 163 may be disposed or provided spaced apart in a circumferential direction of the hub 161.

Each blade 163 may include a leading edge 163*a*, which forms a side end portion or side end, to which air is introduced, and a trailing edge 163*b*, which forms a side end portion or side end, from which air is output. The air having passed through the first filter 120 may be introduced to the first fan housing 150 through the first fan introducing portion 151 with the air flowing in the upward direction. The air may flow in the axial direction of the first fan 160, may be introduced to the first leading edge 163*a*, and may be output to the trailing edge 163*b* via the blade 163. The trailing edge 163*b* may extend at an inclined to the outside with respect to the axial direction in the upward direction corresponding to a flow direction of air so that the air which is output through the trailing edge 163*b* is capable of flowing to the upper side in the radial direction.

Reference to FIG. 5, the first blowing device 100 may further include a first air guide device or guide 170 which may guide a flow of air having passed through the first fan 160 by being coupled to the upper side of the first fan 160. The first air guide 170 may include an outer wall 171 having a cylindrical shape and an inner wall 172 positioned on or at an inside of the outer wall 171 and having a cylindrical shape. The outer wall 171 may be disposed or provided to surround the inner wall 172. A first air flow path 172*a*, through which air may flow, may be formed between an inner circumferential surface of the outer wall 171 and an outer circumferential surface of the inner wall 172.

The first air guide 170 may include a guide rib 175 which may be disposed or provided on or in the first air flow path 172*a*. The guide rib 175 may extend from the outer circumferential surface of the inner wall 172 to the inner circumferential surface of the outer wall 171. A plurality of guide ribs 175 may be disposed or provided spaced apart from each other. The plurality of guide ribs 175 may guide the air introduced to the first air flow path 172*a* of the first air guide 170 via the first fan 160 in the upward direction.

The guide rib 175 may extend at an incline from a lower portion of the outer wall 171 and the inner wall 172 in the upward direction. For example, the guide rib 175 may be rounded, and thus, guide air so that it flows at an incline in the upward direction.

That is, with reference to FIG. 6, the guide rib 175 may include a rib main body 175*a*, which may extend rounded in the upward direction. The rib main body 175*a* may include a positive pressurizing surface 175b which faces in a direction in which an air flow approaches and a negative pressuring surface 175c which is opposite to the positive pressurizing surface 175b. The positive pressurizing surface 175b may have a concave shape and the negative pressurizing surface 175c may have a convex shape.

The rib main body 175a may include a leading edge 175d which forms a side end portion or side end, to which air may be introduced, and a trailing edge 175e which forms a side end portion or side end, to which air may be discharged. The leading edge 175d may be rounded and bent from the positive pressurizing surface 175b toward the negative pressurizing surface 175c. According to this configuration, a portion of air which is introduced via the leading edge 175d may be guided to the positive pressurizing surface 175b and the rest of the air may be guided to the negative pressurizing surface 175c. Air which flows to the negative pressurizing surface 175c may pass by a plurality of projecting portions 175f.

The plurality of projecting portions 175f may project from the negative pressurizing surface 175c and may extend from the leading edge 175d toward the trailing edge 175e. The projecting portion 175f may have an airfoil shape a projecting height of which may be gradually reduced from the leading edge 175d toward the trailing edge 175e. Generation of a vortex on the negative pressurizing surface 175c may be prevented, and thus, air may easily flow toward the upper side, due to the plurality of projecting portions 175f formed on the negative pressurizing surface 175c.

The trailing edge 175e may have a saw tooth shape having peaks and valleys which may be repeated in the radial direction. According to this configuration, a difference between times at which air is output from the trailing edge 175e, that is, air is output from the peaks and valleys from each other may be generated, and thus, generation of noise may be reduced.

The first air guide 170 may further include a motor accommodating portion 173 that extends from the inner wall 172 to the lower side, and thus, accommodates the first fan motor 165. The motor accommodating portion 173 may have a bowl shape, a diameter of which may be gradually reduced in the downward direction. A motor coupling portion 166 may be provided on or at one side of the first fan motor 165 to fix the first fan motor 165 to the first air guide 170. A shape of the motor accommodating portion 173 may correspond to the shape of the hub 161. The motor accommodating portion 173 may be inserted into the hub 161.

The first fan motor 165 may be supported to or at an upper side of the motor accommodating portion 173. The rotational shaft 165a of the first fan motor 165 may extend from the first fan motor 165 in the downward direction and be coupled to the shaft coupling portion 161a of the hub 161 through the lower surface portion of the motor accommodating portion 173.

In addition, a motor coupling portion 166 may be provided on or at an upper side of the first fan motor 165. The motor coupling portion 166 may guide the first fan motor 165 to be fixed to the air guide 170.

Figure 7:
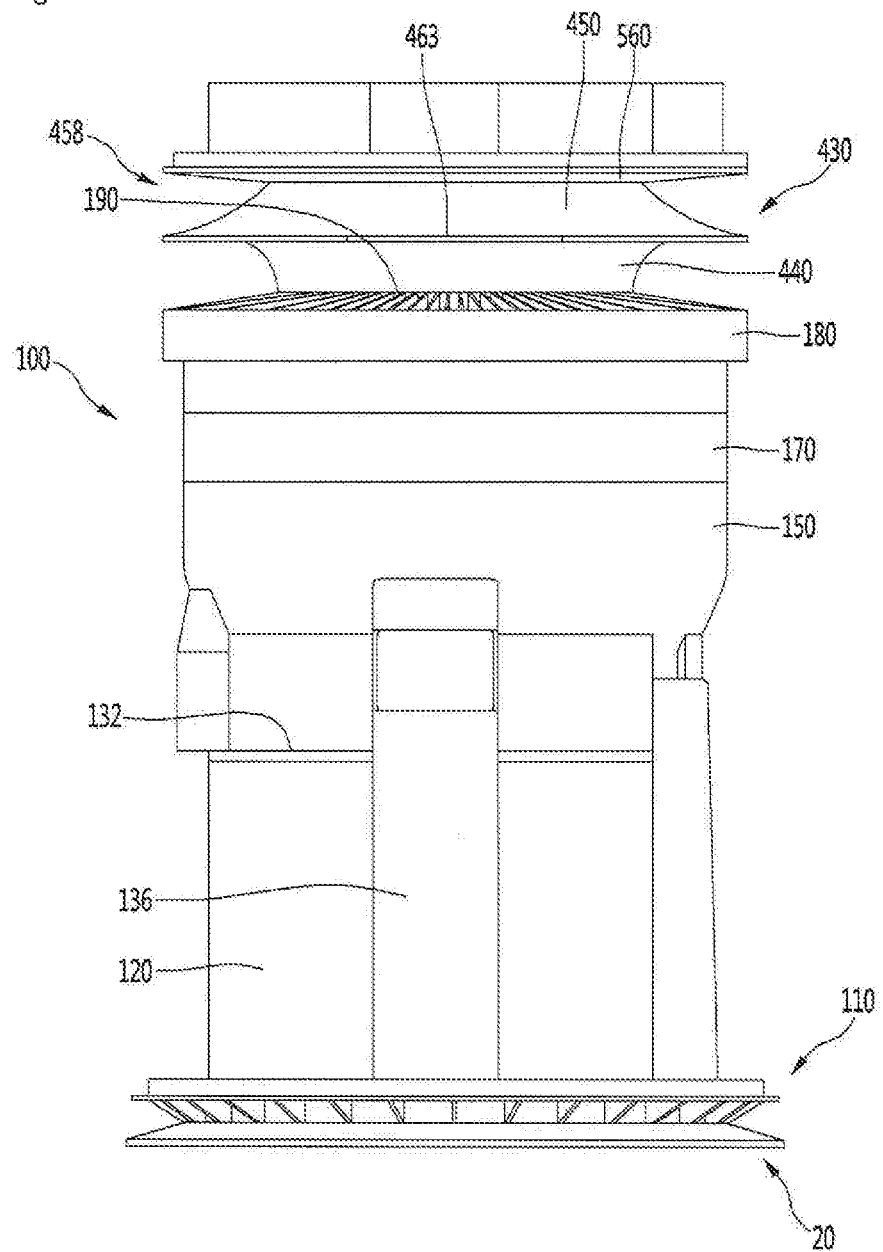
FIG. 7 is a view of a portion of the air cleaner of FIG. 1.
Figure 8:
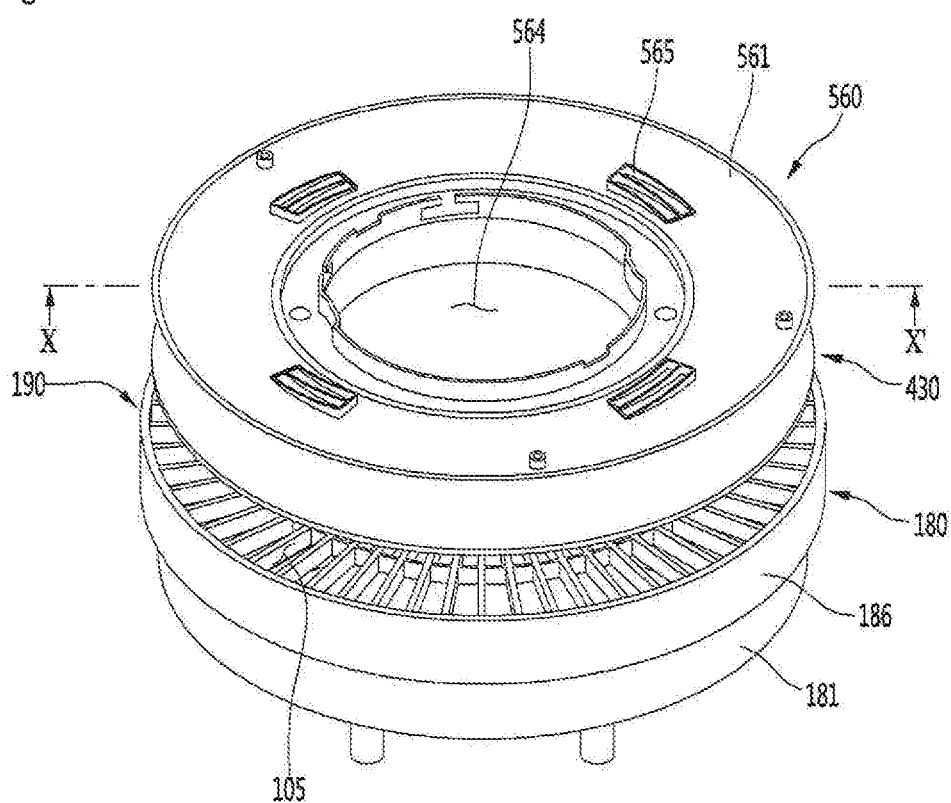
FIG. 8 is a perspective view illustrating a dividing plate and components coupled to the dividing plate according to an embodiment.
Figure 9:
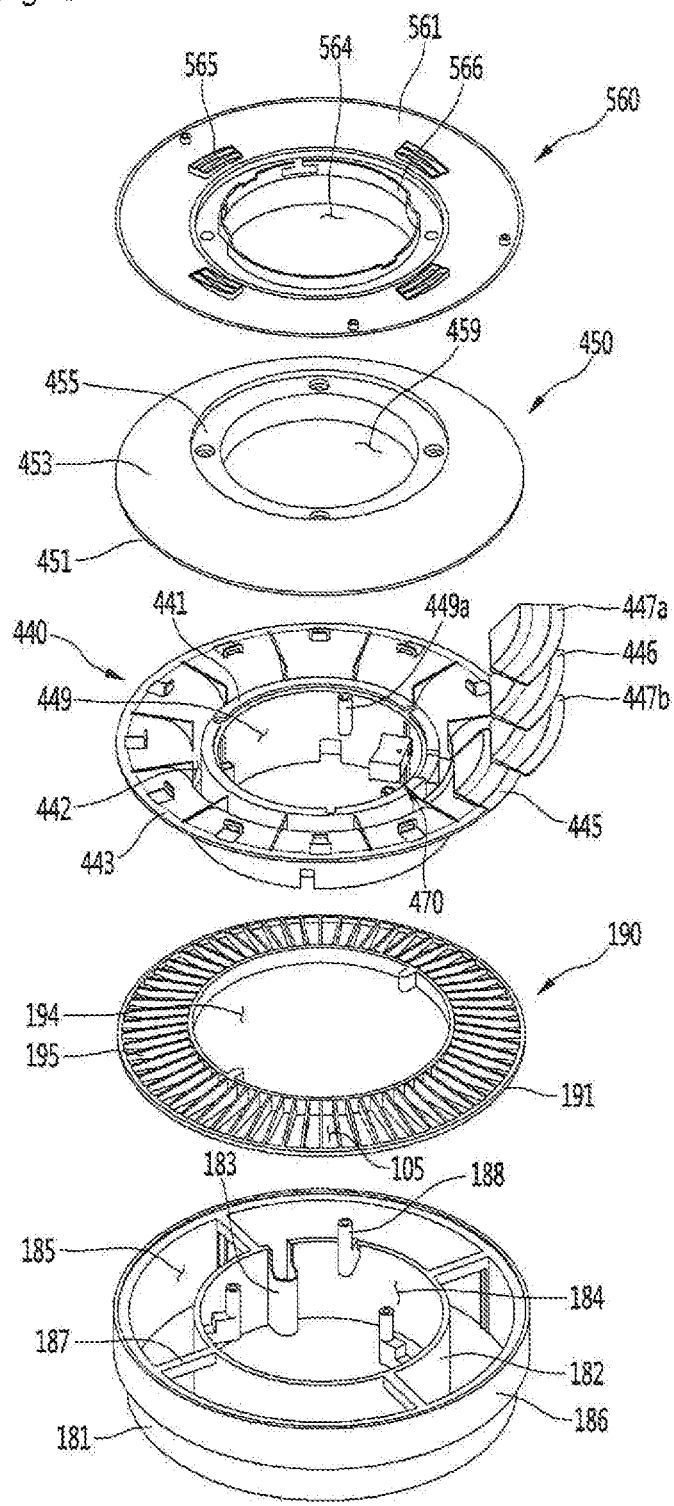
FIG. 9 is an exploded perspective view of the dividing plate and components coupled to the dividing plate of FIG. 8.

FIG. 7 is a view of a portion of the air cleaner of FIG. 1. FIG. 8 is a perspective view of a dividing plate and components coupled to the dividing plate according to an embodiment. FIG. 9 is an exploded perspective view of the dividing plate and components coupled to the dividing plate of FIG. 8.

Referring to FIGS. 7 to 9, the first blowing device 100 according to this embodiment may further include a second air guide device or guide 180, which may be coupled to the upper side of the first air guide 170 and guide air having passed through the first air guide 170 to the discharge guide 190. The second air guide 180 may include a first guide wall 181, which may have a substantially cylindrical shape, and a second guide wall 182, which may be positioned at an inside of the first guide wall 181 and have a substantially cylindrical shape. The first guide wall 181 may be disposed or provided to surround the second guide wall 182.

A second air flow path 185, through which air may flow, may be formed between an inner circumferential surface of the first guide wall 181 and an outer circumferential surface of the second guide wall 182. Air which flows along the first air flow path 172a of the first air guide 170 may flow in the upward direction through the second air flow path 185. The second air flow path 185 may be referred to as a "discharge flow path." In addition, the first discharge portion 105 may be provided on or at an upper side of the second air flow path 185.

A fastening guide 183, which may be coupled with the first air guide 170, may be provided on a lower portion of the second guide wall 182. The fastening guide 183 may extend to the lower side of the second guide wall 182.

A predetermined fastening member may be coupled to the fastening guide 183, and the fastening member may be coupled to a fastening rib 178 of the first air guide 170. The fastening rib 178 may project from an upper surface of the motor accommodating portion 173 in the upward direction. A plurality of fastening guides 183 and a plurality of fastening ribs 178 may be provided.

The second air guide 180 may further include a wall supporting portion or support 187 that extends from an inner circumferential surface of the first guide wall 181 to an outer circumferential surface of the second guide wall 182. The first guide wall 181 and the second guide wall 182 may be stably coupled to each other by the first wall supporting portion 187. A plurality of leg supporting portions 187 may be provided. For example, the plurality of wall supporting portions 187 may include four wall supporting portions 187 extending in four directions. In addition, the first discharge guide 190 may be supported on the plurality of wall support portions 187.

A first space portion or space 184, in which at least a portion of a printed circuit board (PCB) device 500 may be accommodated by passing therethrough in the vertical direction, may be formed inside of the second guide wall 182 having a cylindrical shape. The PCB device 500 may include a power supply 520 and a main PCB 511.

The power supply portion 520 may refer to a device that receives commercial power supplied from a power line connected to the air cleaner 10 to supply power to the main PCB 511 and a plurality of components in the air cleaner 10. The power supply 520 may include a PCB (power PCB) for AC power. The main PCB 511 may include a PCB for DC power, which may be driven by a DC voltage converted in the PCB for AC power.

The PCB device 500 may further include a PCB supporting plate 525 that supports the power supply portion 520 and the main PCB 511. The main PCB 511 may be supported on one or a first surface of the PCB supporting plate 525, and the power supply portion 520 may be supported on the other or a second surface of the PCB supporting plate 525.

The PCB device 500 may include a communication module 515 through which the air cleaner 10 is capable of communicating with an external device. For example, the communication module 515 may include a Wi-Fi module. The communication module 515 may be supported on the PCB supporting plate 525, and may be disposed or provided at a lower side of the main PCB 511.

The second air guide 180 may include a bending portion 186 that extends from an upper portion of the first guide wall 181 in an outer direction. The bending portion 186 may extend to the outside in the radial direction from the upper end of the first guide wall 181 and be bent in the downward direction. For example, the bending portion 186 may have a substantially eave shape.

The first blowing device 100 may further include a first discharge guide device or guide 190, which may be disposed or provided on or at an upper side of the second air guide 180, that is, an outlet side of air flow passing through the second air guide 180 relative to the air flow and guide the air discharge to the outside portion of the air cleaner 10.

The first discharge guide 180 may include a first discharge main body 191 which forms the second space portion or space 194 on the substantially central portion. For example, the first discharge main body 191 may have an annular shape.

At least a portion of the PCB device 500 may be accommodated in the second space portion 194. The second space portion 194 may be formed on or at an upper side of the first space portion 184 and form an installation space portion or space in which the PCB device 500 may be installed, along with the first space portion 184.

The first discharge main body 191 may include a first discharge grill 195. A plurality of first discharge grills 195 may be provided and the first discharge portion 105, by which air may be discharged to the outside, may be formed between the plurality of first discharge grills 195. The plurality of the first discharge grills 195 may be disposed or provided on or at an upper side of the second air flow path 185, and the air having passed through the second air flow path 185 may flow to the first discharge grill 195 side and may be discharged through the first discharge portion 105.

The second blowing device 200 may include a second filter member or filter 220, a supporting device or support that supports a lower portion of the second filter 220, and a lever device or lever, which may be provided on or at a lower side of the supporting device. As the supporting device and the lever device may be the same as or similar to the supporting device 140 and the lever device 132 of the first blowing device 100, repetitive disclosure has been omitted.

The second blowing device 200 may include the second filter 220 of the second blowing device 220 and a lever supporting device or support 560 that supports the lever device. The lever supporting device 560 may have a substantially annular shape. The lever supporting device 560 may include a third space portion or space 564 which defines an installation space in which the PCB device 510 may be positioned or provided. The third space portion 564 may be formed on a substantially central portion of the lever supporting device 560 therethrough in the vertical direction.

The lever supporting device 560 may include a lever supporting main body 561 which may have an annular shape. The lever supporting main body 561 may extend toward an outer circumferential surface from an inner circumferential surface thereof to be slightly inclined in the upward direction relative to the axial direction. That is, the surface constituting the lever supporting main body 561 may form an inclined surface. A space between the inclined surface and the upper surface of a dividing plate 430 to be described hereinafter may provide a space portion or space in which a user's hand is capable of being located.

The lever supporting main body 561 may be referred to as a "blocking portion" in that air which is discharged through the first discharge portion 105 of the first blowing device 100 may be blocked from being introduced to the second blowing device 200.

The lever supporting device 560 may further include a movement guide portion or guide 565 that protrudes from the lever supporting main body 561 in the upward direction. The movement guide 565 may have the same configuration as the movement guide 113 of the first blowing device 100, and therefore, repetitive disclosure has been omitted. For convenience of description, the movement guide 113 may be referred to as a "first movement guide portion or guide" and the movement guide 565 may be referred to as a "second movement guide portion or guide."

The lever supporting device 560 may further include a supporting jaw 565 that projects from an inner circumferential surface of the lever supporting main body 561 in the upward direction. The supporting jaw 566 may support the lever device of the second blowing device 200.

A dividing device 400 may be provided between the first blowing device 100 and the second blowing device 200. The dividing device 400 may include a dividing plate 430 that separates or blocks air flow generated in the first blowing device 100 and air flow generated in the second blowing device 200. By the dividing plate 430, the first and second blowing devices 100 and 200 may be spaced apart from each other in the vertical direction.

That is, a separation space in which the dividing plate 430 may be located or provided may be formed between the first and second blowing devices 100 and 200. The first discharge guide 190 of the first blowing device 100 may be located at a lower end portion or end of the separation space, and the lever supporting device 510 of the second blowing device 200 may be located at an upper end portion or end of the separation space.

The separation space may be divided into an upper space and a lower space by the dividing plate 430. The lower space may be a first space 448 (see FIG. 12) portion or space through which air discharged from the first discharge portion 105 of the first discharge guide 190 may pass in a process in which the air flows to the outside of the air cleaner 10. The upper space may be a second space portion or space 458 (see FIG. 12) that functions as a grasping space into which a user may put his or her hand when moving the air cleaner 10.

Air discharged from the first discharge portion 105 may be guided by the dividing plate 430 to flow to the outside of the air cleaner 10. Accordingly, it is possible to prevent the air from being introduced into the second blowing device 200.

The dividing plate 430 may include a first plate 440, and a second plate 450 coupled to the first plate 440. The second plate 450 may be provided on or at an upper side of the first plate 440. In addition, the first plate 440 may extend rounded in the upward direction, and the second plate 450 may extend rounded in the downward direction.

The first plate 440 may include a plate inner wall 441, which may have a substantially annular shape, and a plate outer wall 443, which may surround the plate inner wall 441. A fourth space portion or space 449 that passes through the first plate 440 in the vertical direction may be formed at a center portion of the plate inner wall 441. The fourth space portion 449 may provide an installation space in which at least a portion of the PCB device 500 may be located or provided.

The plate outer wall 443 may extend from the plate inner wall 441 to the outside in the radial direction. That is, the first plate 440 may include a wall connecting portion 442a that extends in the radial direction between a lower end portion or end of the plate inner wall 441 and a lower end portion or end of the plate outer wall 443.

The plate outer wall 443 may extend rounded from the wall connecting portion 442a in the upward direction. For example, at least a portion of the plate outer wall 443 forms a curved portion 444a (see FIG. 12) having a predetermined curvature radius.

The first plate 440 may include a depression portion or depression 442 which defines a space between the plate inner wall 441 and the plate outer wall 443. The depression portion 442 may be depressed in the downward direction in a space between the upper end portion of the plate inner wall 441 and the upper end portion of the plate outer wall 443.

The first plate 440 may include a first coupling portion 449a, which may be coupled to the second air guide 180. The first coupling portion 449a may be provided on an inner circumferential surface of the plate inner wall 441. In addition, the first coupling portion 449a may be coupled to a second coupling portion 188 of the second air guide 180. The second coupling portion 188 may be provided on an inner circumferential surface of the second guide wall 182.

The plate outer wall 443 may include a first engaging rib 443b, which may be coupled with the second plate 450. The first engaging rib 443b may be provided on an upper surface of the plate outside wall 443 and a plurality of engaging ribs may be disposed or provided apart from each other along the rim of the plate outside wall 443.

A display device or display 460 that displays information relative to an operation of the air cleaner 10 may be installed or provided at the dividing plate 430. For example, the information may include information on an air pollution level or air cleanliness.

The display device 460 may be installed or provided in a space between the first plate 440 and the second plate 450. A device mounting portion or mount 445 on which the display device 450 may be mounted, may be formed on the first plate 440. The device mounting portion 445 may be formed on an upper surface of the plate outer wall 443.

An outer circumferential surface of the device seating portion 445 may project in the radial direction farther than the outer circumferential surface of the plate outer wall 443. According to this configuration, as an outer end portion or end of a diffusion portion or diffuser 446 described hereinafter projects to the outside of the first plate 440, an intensity of light displayed on the display device 460 may be implemented clearly towards the outside (see FIG. 14).

The display device 460 may include a light source 462. The light source 462 may be installed or provided on a light supporting portion or support 461. The light supporting portion 461 may include a mounting groove 461a, into which the light source 462 may be inserted. For example, the light source 462 may include a light emitting diode (LED).

The light source 462 may be controlled to implement various colors. That is, the light source 462 may implement various colors which correspond to a level of the air cleanliness degree in the indoor space and display its level. For example, the light source 462 may be controlled to implement green, yellow, and red. In a case in which the light source 462 displays green, the air cleanliness degree of the indoor space may be in a "high state", in a case in which the light source 462 displays yellow, the air cleanliness degree of the indoor space may be in a "medium state", and in a case in which the light source 462 displays red, the air cleanliness degree of the indoor space may be in a "low state".

Accordingly, a level of the air cleanliness degree may be intuitively provided to a user by changing the color according to the level and then displaying the level. Finally, the air cleanliness degree may be easily displayed without additional display means, such as letters or figures.

A plurality of light sources 462 may be provided. The plurality of light sources 462 may be controlled to implement different colors from each other. For example, one light source may displays green, another light source may display yellow, and another light source may display red.

The display device 460 may further include the diffusion portion 446, which may be provided on or at one side of the light source 462 and transfer light emitted from the light source 462 to a display portion 463. The light may be diffused while passing through the diffusion portion 446. For example, the diffusion portion 446 may be made of a translucent material. The translucent material may include acrylic or polymethyl methacrylate resin (PMMA).

The diffusion portion 446 may extend from the light source 462 toward the outside in the radial direction. A cross-sectional area of the diffusion portion 446 may gradually increase toward the outside in the radial direction. According to this configuration, the light which is emitted from the light source 462 may be gradually diffused while passing through the diffusion portion 446.

A thickness of the diffusion portion 446 may gradually decreased from the light source 462 to the outside in the radial direction. According to this configuration, the light which is emitted from the light source 462 may be gradually concentrated while passing through the diffusion portion 446. Accordingly, an intensity of the light may be stronger.

The display device 460 may include reflecting sheets 447a and 447b, which may be provided on at least one side of the diffusion portion 446 and reflect the light in order to concentrate the light which is diffused through the diffusion portion 446 on an outer circumferential surface of the dividing plate 430. For example, the reflecting sheets 447a and 447b may include a first reflecting sheet 447a, which may be provided on or at an upper side of the diffusion portion 446, and a second reflecting sheet 447b, which may be provided on or at a lower side of the diffusion portion 446. The first reflecting sheet 447a and the second reflecting sheet 447b may be made of an opaque material from which light may be easily reflected. For example, the first reflecting sheet 447a and the second reflecting sheet 447b may be made of polyethylene naphthalate (PET), stainless steel, brass, or aluminum.

According to this configuration, the light which is emitted from the light source 462 may be concentrated on the diffusion portion 446 by the first reflecting sheet 447a and the second reflecting sheet 447b and may be converted into subtle or soft light while passing through the diffusion portion 446.

The display device 460 may include the display portion 463 that displays a predetermined color toward the outside. The display portion 463 may be provided on at least a portion of the outer circumferential surface of the dividing plate 430.

That is, the display portion 463 may be disposed or provided between the outer circumferential surfaces of the first plate 440 and the second plate 450. The display portion 463 may include an outer circumferential surface area of the diffusion portion 446. That is, the light, which is emitted from the light source 462 may be reduced to subtle or soft light while passing through the diffusion portion 446 and may be displayed through the outer circumferential surface of the diffusion portion toward the outside.

The display device 460 may further include a lighting PCB device 470 that controls an operation of the light source

463. The light source 463 may be coupled to the lighting PCB device 470 and then may be disposed to face the diffusion portion 446.

The second plate 450 may include a second plate main body 451, which may have a substantially annular shape. The second plate 450 may include a plate seating portion or seat 455 that projects from an inner circumferential surface of the second main body 451 to the inside in the radial direction. The plate seating portion 445 may be depressed from an upper end portion or end of the second plate main body 451 in the downward direction, and thus, may support the lever supporting device 560.

A fifth space portion or space 459, may penetrate in the vertical direction a central portion of the plate seating portion 455. The fifth space portion 459 may provide an installation space in which at least a portion of the PCB device 500 may be positioned. The fifth space portion 459 may be aligned to a lower side of the fourth space portion 459. The first space portion to the fifth space portion 184, 194, 564, 449, and 459 may be aligned in the vertical direction, and thus, provide an installation space for the PCB device 500.

The second plate main body 451 may extend at an incline to the outside in the radial direction. That is, the second plate main body 451 may include an inclined surface 453 that extends at an inclined from the inner circumferential surface of the second plate main body 451 toward the outer circumferential surface in the downward direction. For example, the inclined surface 453 may have a rounded surface which extends to be rounded.

The second space portion 458 may be formed between a bottom surface of the lever supporting main body 561 and the inclined surface 453. The second space portion may be referred to as "grasping space portion" or space.

Figure 10:
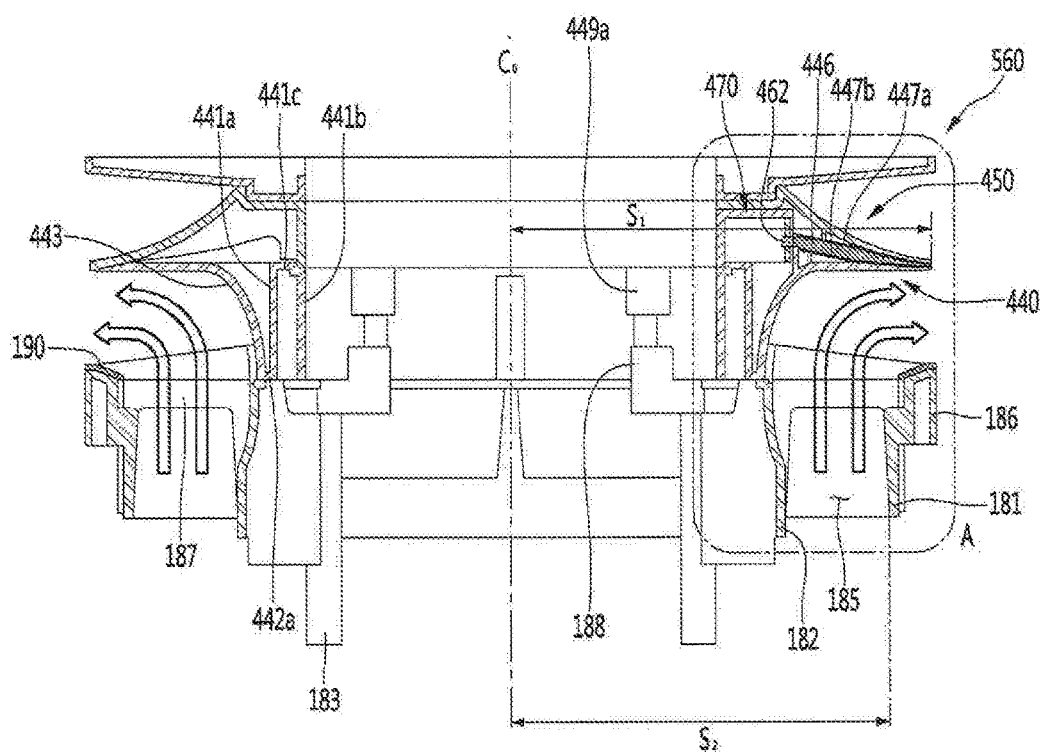
FIG. 10 is a cross-sectional view, taken along line X-X' in FIG. 8.
Figure 11:
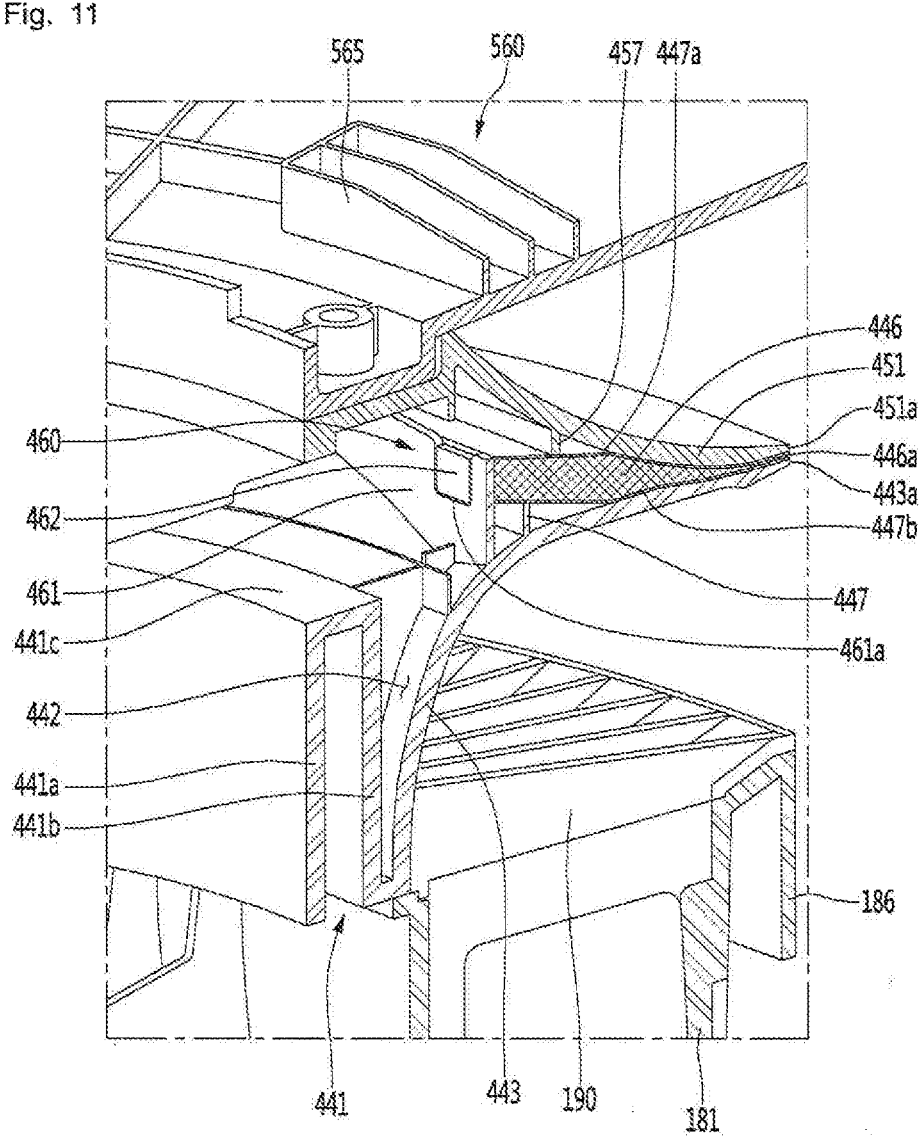
FIG. 11 is a view illustrating a disposition state of the dividing plate and a first discharge guide according to an embodiment.
Figure 12:
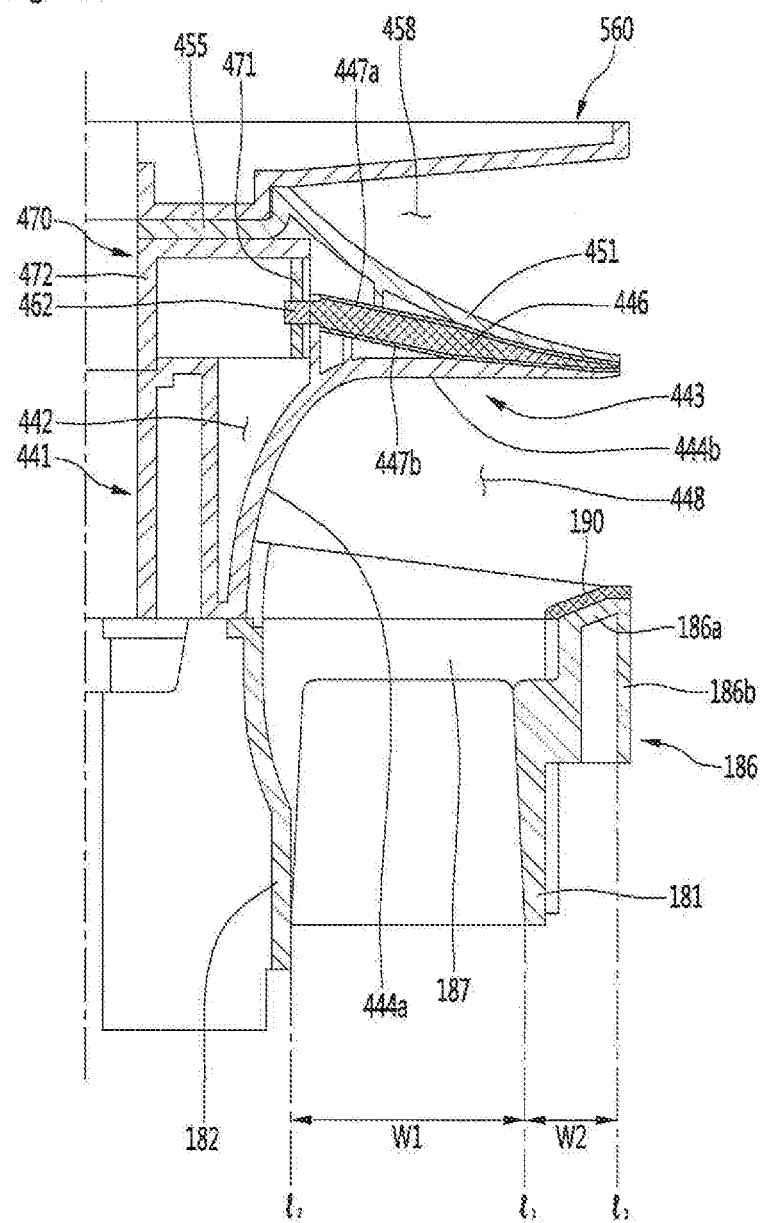
FIG. 12 is an enlarged view of portion "A" in FIG. 10.

FIG. 10 is a cross-sectional view, taken along line X-X' in FIG. 8. FIG. 11 is a view illustrating a disposition state of a dividing plate and a first discharge guide according to an embodiment. FIG. 12 is an enlarged view of portion "A" in FIG. 10.

With reference to FIG. 10 to FIG. 12, the first blowing device 100 according to an embodiment may include a second air guide device or guide 180 and a first discharge guide device or guide 190, which may be coupled to an upper side of the second air guide 180 and has the first discharge portion 105. The air cleaner 10 may include a dividing plate 430, which may be disposed or provided on or at an upper side of the first discharge guide 190 and guide the air which is discharged through the first discharge portion 105 outside of the air cleaner 10 in the radial direction.

The air cleaner 10 may include the lever supporting device 560, which may be coupled to an upper side of the dividing plate 430. The lever supporting device 560 may form a lower configuration of the second blowing device 200.

The air having passed through the first fan 160 may flow in the upward direction while passing through the first air guide 170 and may be discharged from the discharge guide 190 through the second air guide 180 in the upward direction. The air discharged in the upward direction may be changed in direction to the outside in the radial direction by the dividing plate 430 and then may be discharged to the outside of the air cleaner 10.

The second plate 450 may be stably coupled to an upper side of the first plate 440. The plate inner wall 441 of the first plate 440 may include a first wall 441*a*, a second wall 441*b* that extends in the vertical direction and spaced apart from the first wall 441*a*, and a third wall 441*c* that connects upper portions of the first wall 441*a* and the second wall 441*b* with each other.

The first wall 441*a* may be disposed or provided on or at an outside of the second wall 441*b*, and the third wall 441*c* may support a lower surface of the second plate 450. According to this configuration, a stable coupling structure of the first plate 440 and the second plate 450 may be implemented.

The plate outer wall 443 of the first plate 440 may be supported by an upper side of the second guide wall 182 of the second air guide 180. The plate outer wall 443 may include a curved portion 444*a*, which may extend rounded with a predetermined curvature from the first discharge portion 105. A direction in which the curved portion 444*a* extends rounded may be understood as a direction of extending from a lower end portion or end of the plate outer wall 443 to an upper side in the radial direction. According to the configuration of the curved portion 444*a*, change in direction to the outside in the radial direction may be easily performed with flow resistance to the air, which is discharged through the first discharge portion 105 of the first discharge guide 190 in the upward direction, being reduced.

The plate outer wall 443 may include a straight surface portion 444*b*, which may extend linearly. The straight surface portion 444*b* may extend from the curved surface portion 444*a* to the outside in the radial direction. By including the straight surface portion 444*b*, the air which may begin to change in direction through the curved surface portion 444*a* may be guided by the straight surface portion 444*b* and may be easily discharged to the outside in the radial direction of the air cleaner 10.

The second plate 450 may be coupled to an upper side of the first plate 440. A second engaging rib (not illustrated), which may be coupled to the first engaging rib 443*b* of the first plate 440 may be included in a lower surface of the second plate 450.

The second plate main body 451 of the second plate 450 may include an inclined surface 453 that extends rounded. A direction of the inclined surface 453 may be a direction of extending from an upper end portion or end of an inner circumferential surface of the second plate main body 451 to a lower side in the radial direction.

The plate outer wall 443 may include a first end portion or end 443*b*, which may be coupled with the second end portion 451*a* of the second plate 450. A first end portion or end 443*a* may form the straight surface portion 444*b*, in particular, an end portion of the device seating portion 445. The second end portion 451*a* may form an end portion of the second plate main body 451.

The display device 460 may be disposed or provided on or in a space of the first plate 440 and the second plate 450. The display device 460 may include a light supporting portion or support 461, which may be disposed or provided on an upper surface of the plate outer wall 443, the light source 462, which may be installed or provided on the mounting groove 46 of the light supporting portion 461, and the diffusion portion 446, which may be disposed on the outside of the light source 461 and extend in the radial direction.

The diffusion portion 446 may include a third portion 446*a*, which may be disposed or provided between the first end portion 443*a* of the plate outer wall 443 and the second end portion 451*a* of the second plate 450. The third end portion 446*a* may form an outer circumferential surface of the diffusion portion 446. The first end portion 443*a*, the third end portion 446*a*, and the second end portion 451*a* may be aligned in the vertical direction. According to this configuration, a line of the diffusion portion 446 which emits subtle or soft light to the space between the first plate 440 and the second plate 450 may be exposed to the outside. The line of the diffusion portion 446 may form the display portion 463.

A first sheet supporting portion or support 447, which may support a lower surface of the second reflecting sheet 447b, may be provided on the plate outer wall 443. The first sheet supporting portion 447 may project from the upper surface of the plate outside wall 443 in the upward direction and may be in contact with the second reflecting sheet 447b.

The second plate main body 451 may include a second sheet supporting portion or support 457 that presses an upper surface of the first reflecting sheet 447a. The second sheet supporting portion 457 may project from a lower surface of the second plate main body 451 in the downward direction and may be in contact with the first reflecting sheet 447a. According to this configuration of the first sheet supporting portion 447 and the second sheet supporting portion 457, the diffusion portion 446 and the first reflecting sheet 447a and the second reflecting sheet 447b may be easily fixed by the dividing plate 430.

The second air guide 180 may include a bending portion 186 that extends from the first guide wall 181 in the outer direction. The bending portion 186 may include a first extending portion or extension 186a that extends from the first guide wall 181 to the outside in the radial direction, and a second extending portion or extension 186b that extends from the first extending portion 186a in the downward direction.

The first discharge guide 190 may be disposed or provided on an upper side of the second air guide 180. The first discharge guide 190 may include a first discharge main body 191 having an annular shape. The first discharge main body 191 may include a plurality of discharge grills 195 that extends from an inner circumferential surface toward an outer circumferential surface of the first discharge main body 191 and forms the first discharge portion 105. The inner circumferential surface of the first discharge main body 191 may be in contact with an outer surface of the curved surface portion 444a.

The first discharge main body 191 may further include a bend supporting portion or support 197, which may be provided between the plurality of discharge grills 195 and supported by the first extending portion 186a. A plurality of bend supporting portions 197 may be provided along a rim of the first discharge main body 191. The bend supporting portion 197 may be connected to the outside of the plurality of discharging grills 195 in the radial direction.

Discharge of air may be blocked in a space in which the first extending portion 186a and the bend supporting portion 197 are aligned in the vertical direction. In summary, the first discharge portion 105 may be an inside space formed by an inner circumferential surface of the first discharge main body 191, the two closest discharge grills 195, and the bend supporting portion 197. A plurality of first discharge portion 105 may be included.

The first discharge guide 190 may further include a grill supporting portion or support 196, which may be supported by the wall supporting portion 187 of the second air guide 180. The grill supporting portion 196 may be disposed or provided between one discharge grill and the other discharge grill of the plurality of discharge grills 195. A number of the grill supporting portion 196 may be provided to correspond to a number of the wall supporting portion 187. For example, as described above, in a case where four wall supporting portions 187 are provided, four grill supporting portions 196 may be provided. A discharge flow path, that is, the first discharge portion 105 may not be provided in a space in which the wall supporting portions 187 and the grill supporting portion 196 is provided.

An outermost portion of the dividing plate 430 in the radial direction may be positioned further than an outermost of the first discharge portion 105 in the radial direction. That is, when a first imaginary line l1 that vertically extends to the outermost portion of the first discharge portion 105 in the radial direction is defined, the first imaginary line l1 passes through the dividing plate 430.

When a second imaginary line l2 that extends along the outer circumferential surface of the second guide wall 192 of the second air guide 180 in the vertical direction is defined, the second imaginary line l2 passes through an innermost portion of the first discharge portion 105. Accordingly, a distance w1 between the first imaginary line l1 and the second imaginary line l2 may indicate a width of the first discharge portion 105. When a third imaginary line l3 that extends along the outer circumferential surface of the second extending portion 186b in the vertical direction is defined, the third imaginary line l3 passes through the end portions 443a and 451a of the dividing plate 430.

A distance w2 between the second imaginary line l2 and the third imaginary line l3 may indicate a width of the first extending portion 186a or the bend supporting portion 197 in the radial direction. A width of the dividing plate 430 in the radial direction may correspond to a value which adds the width w1 of the first discharge portion 105 and the width w2 of the first extending portion 186a.

In summary, as the inner circumferential surface of the first discharge main body 191 is disposed or provided to be in contact with the curved surface portion 444a of the dividing plate 430, the innermost portion of the first discharge portion 105 may be understood as one disposed on the position corresponding to the curved surface portion 444a. A width w1+w2 of the dividing plate 430 in the radial direction may be greater than the width w1 of the discharge portion 105 by the width w2 of the first extending portion 186a.

Accordingly, as the dividing plate 430 is elongated to completely cover the upper side of the first discharge portion 105 and an outermost portion of the dividing plate 430 is further positioned on the outside than the outermost portion of the first discharging portion 105, a phenomenon where the air which is discharged through the first discharge portion 105 is introduced to the second blowing device 200 over the dividing plate 430, that is, an air returning phenomenon may be prevented.

When a center line Co of the air cleaner 10 in the radial direction is defined, a distance S1 from the center line Co to the outermost portion of the dividing plate 430 may be greater than a distance S2 to the outermost portion of the discharge flow path 185, which may be formed on the first discharge guide 190. The center line Co may constitute a center line of the first blowing device 100 or a center line of the second blowing device 200.

The first end portion 443a and the second end portion 451a may be disposed or provided on or at the outermost portion of the dividing plate 430 and the first guide wall 181 may be disposed or provided on the outermost portion of the discharge flow path 185. That is, the distance S1 may be a distance from the center line Co to the first end portion 443a and the second end portion 451a and the distance S2 may be a distance from the center line Co to the first guide wall 181.

According to the configuration, as the dividing plate 430 is elongated to completely cover the outside portion of the discharge flow path 185 while being disposed on the upper side of the discharge flow path 185, a phenomenon of the air which is discharged from the discharging flow path 185 being guided by the dividing plate 430, being discharged in the radial direction and then being suctioned to the second blowing device 200 over the dividing plate 430 may be limited.

The lighting PCB device 470 may include a lighting PCB 471, to which the light source 462 may be coupled and which controls operation of the light source 462, and a PCB case 472, on which the lighting PCB 471, may be mounted. Hereinafter, the lighting PCB device 470 will be described.

Figure 13:
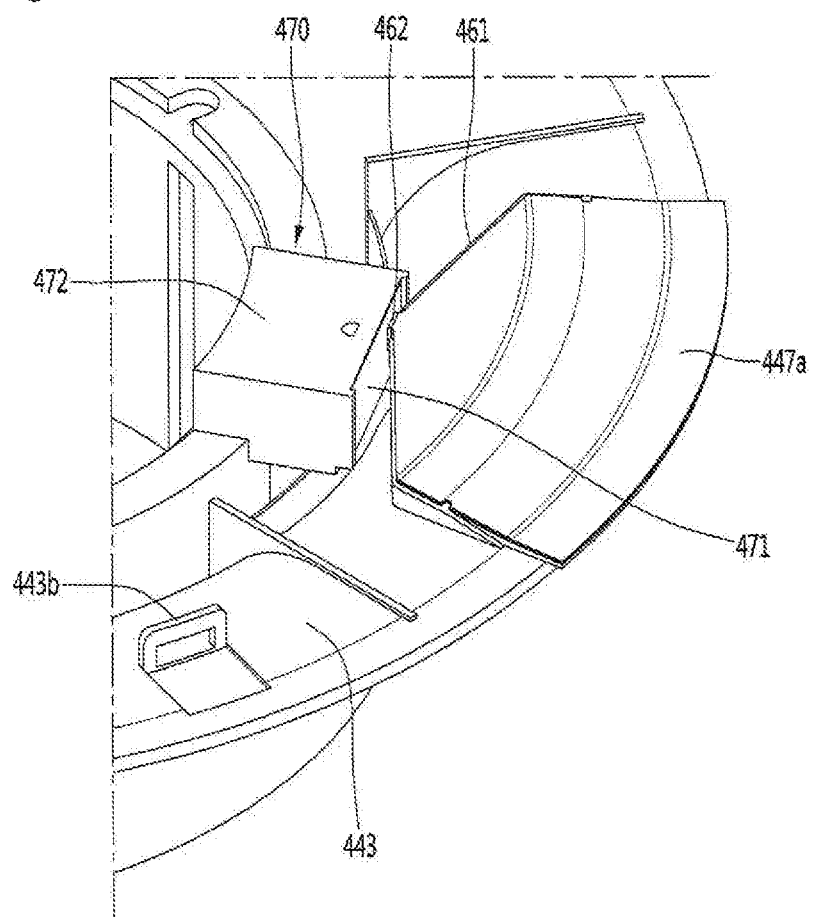
FIG. 13 is a perspective view illustrating a coupling between a lighting printed circuit board (PCB) device and a first plate according to an embodiment.
Figure 14:
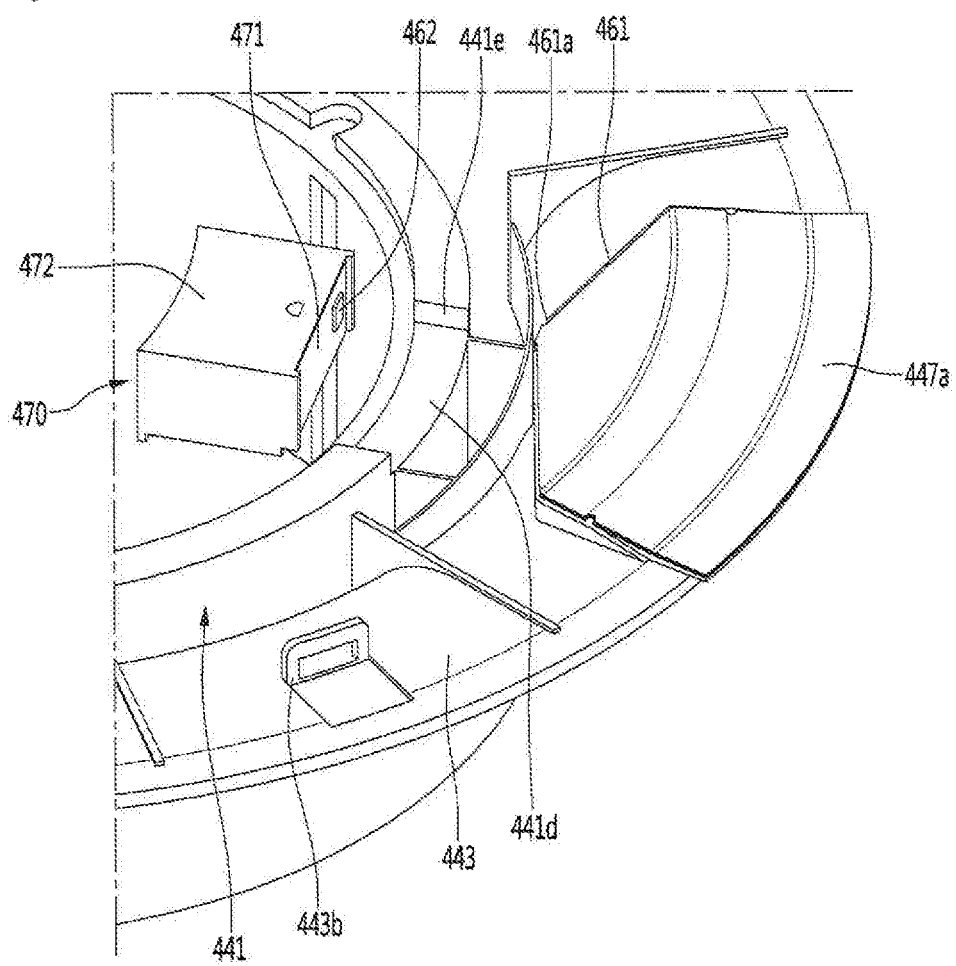
FIG. 14 is an exploded perspective view of the lighting PCB device and the first plate according to an embodiment.
Figure 15:
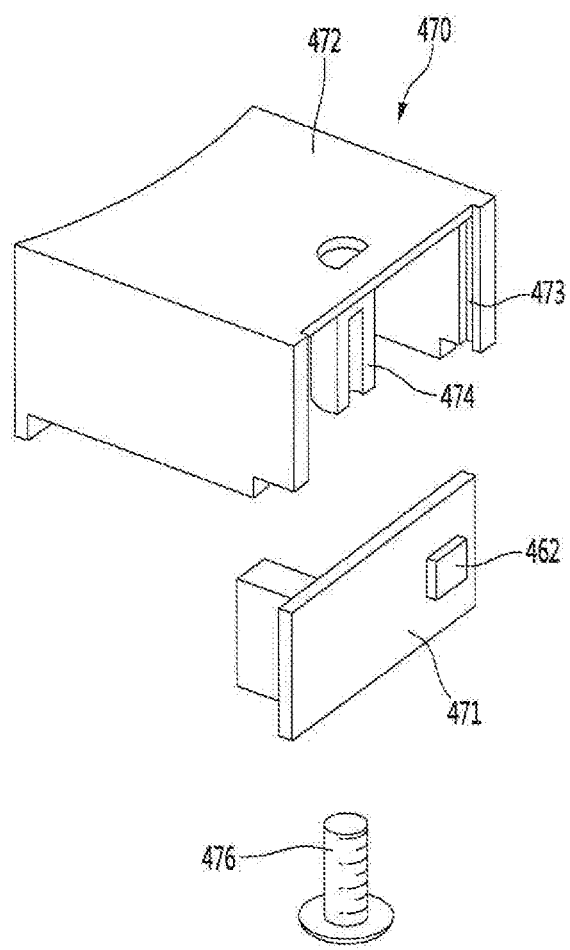
FIG. 15 is an exploded perspective of the lighting PCB device according to an embodiment.
Figure 16:
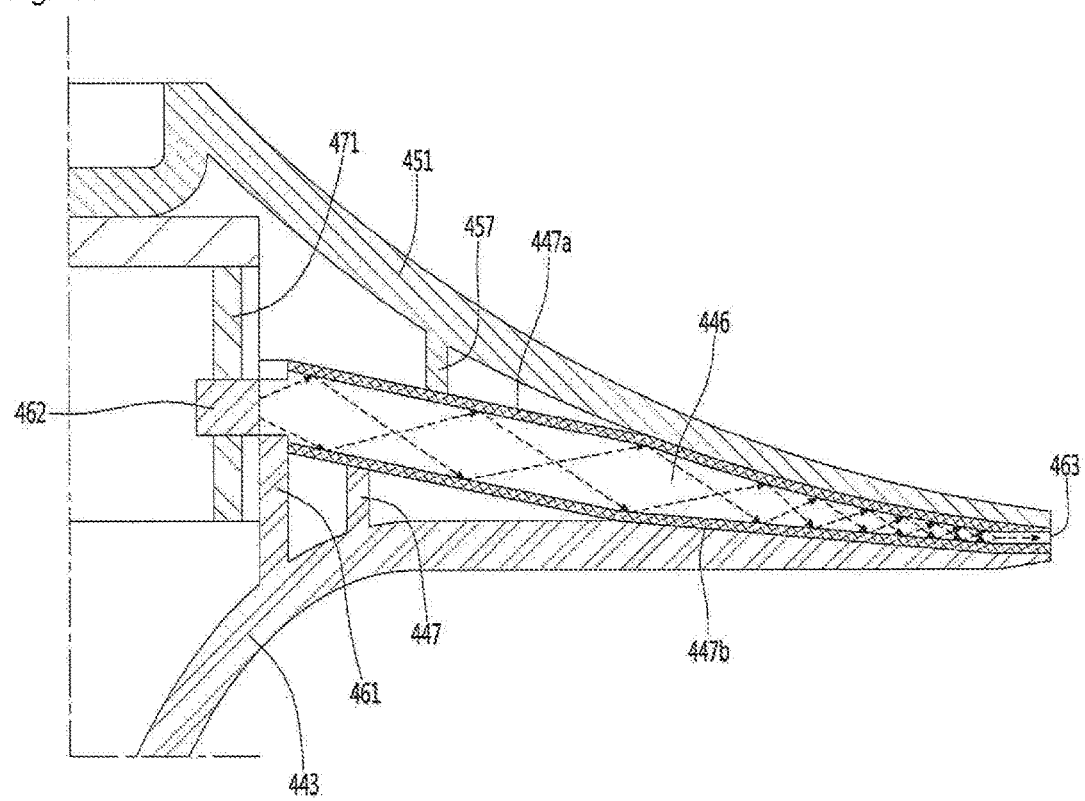
FIG. 16 is a view illustrating a state in which light emitted from a light source is transferred toward outside of the air cleaner according to an embodiment.

FIG. 13 is a perspective view illustrating a coupling between a lighting PCB device and a first plate according to an embodiment. FIG. 14 is an exploded perspective view of the lighting PCB device and the first plate according to an embodiment. FIG. 15 is an exploded perspective view of the lighting PCB device according to an embodiment. FIG. 16 is a view illustrating a state in which light emitted from a light source is transferred toward the outside of the air cleaner, with respect to the diffusion portion according to an embodiment.

With reference to FIG. 13 to FIG. 15, the lighting PCB device 470 according to this embodiment may include the lighting PCB 471, on which the light source 462 may be mounted, and the PCB case 472, which may be coupled to the lighting PCB 471.

The lighting PCB 472 may be separately mounted to the PCB case 472. The PCB case 472 may have a substantially cube shape, a lower portion of which may be opened. The PCB case 472 may include a guide groove 473 that guides a coupling of the lighting PCB 471. The guide groove 473 may be included on both sides of an inside surface of the PCB case 472.

The lighting PCB 472 may be coupled to the PCB case 472 while being moved from a lower side of the PCB case 472 in the upward direction along the guide groove 473. In contrast, when the lighting PCB 472 is separated from the PCB case 472, the lighting PCB 471 may be slid from the PCB case 472 in the downward direction.

A fastening hole 474 to fasten a fastening member 476 may be formed in the PCB case 472. The fastening member 476 may be coupled to the fastening hole 474 in a state in which the lighting PCB 471 is coupled to the PCB case 472. When the fastening member 476 is coupled to the fastening hole 474, the fastening member 476 may support the lighting PCB 471, and thus, the lighting PCB 471 may be prevented from being separated from the PCB case 472.

The light source 462 may be mounted on a surface of the lighting PCB 471. One surface of the lighting PCB 471 may be a surface that faces the diffusion portion 446. The PCB case 472 may be coupled to a plate inside surface of the first plate 440. A seating portion or seat 441$d$, in or on which the PCB case 472 may be seated, may be formed in the plate inner wall 441. The seating portion 441$d$ may be depressed from the upper surface in the downward direction of the plate inner wall 441.

The plate inner wall 441 may include a jaw 441$e$ that extends from the upper surface of the plate inner wall 441 in the downward direction toward the seating portion 441$d$. By the jaw 441$e$, a step between an upper surface of the plate inner wall 441 and the seating portion 441$d$ may be defined. The jaw 441$e$ may be provided on both sides of the seating portion 441$d$ and perform a function of supporting the PCB case 472.

For example, the PCB case 472 may be coupled by sliding from the inside of the plate inside wall 441 toward the seating portion 441$d$. When the PCB case 472 is coupled to the seating portion 441$d$, the light source 462 provided in the lighting PCB 471 may be inserted into the mounting groove 461$a$ of the light supporting portion 461. The light source 462 may emit light toward the diffusion portion 461.

With reference to FIG. 16, the light source 462 may emit light toward the diffusion portion 446, which may be toward the outside in the radial direction by the control of the lighting PCB 471. The light may be diffused through the diffusion portion 446, and in this process, when light reaches the first reflecting sheet 447$a$ and the second reflecting sheet 447$b$, reflection of the light may be performed. Light may be moved again to the diffusion portion 446 by the reflection.

Finally, in the process of diffusion and reflection, light may be concentrated on a portion having a thin thickness of the diffusion portion 446 while moving to the outside in the radial direction. Finally, the light which is emitted from the light source 462 may be gradually concentrated while passing through the diffusion portion 446. Accordingly, an intensity of the light may be stronger. A third end portion or end 446$a$ of the diffusion portion 446 may form the display portion 463.

Figure 17:
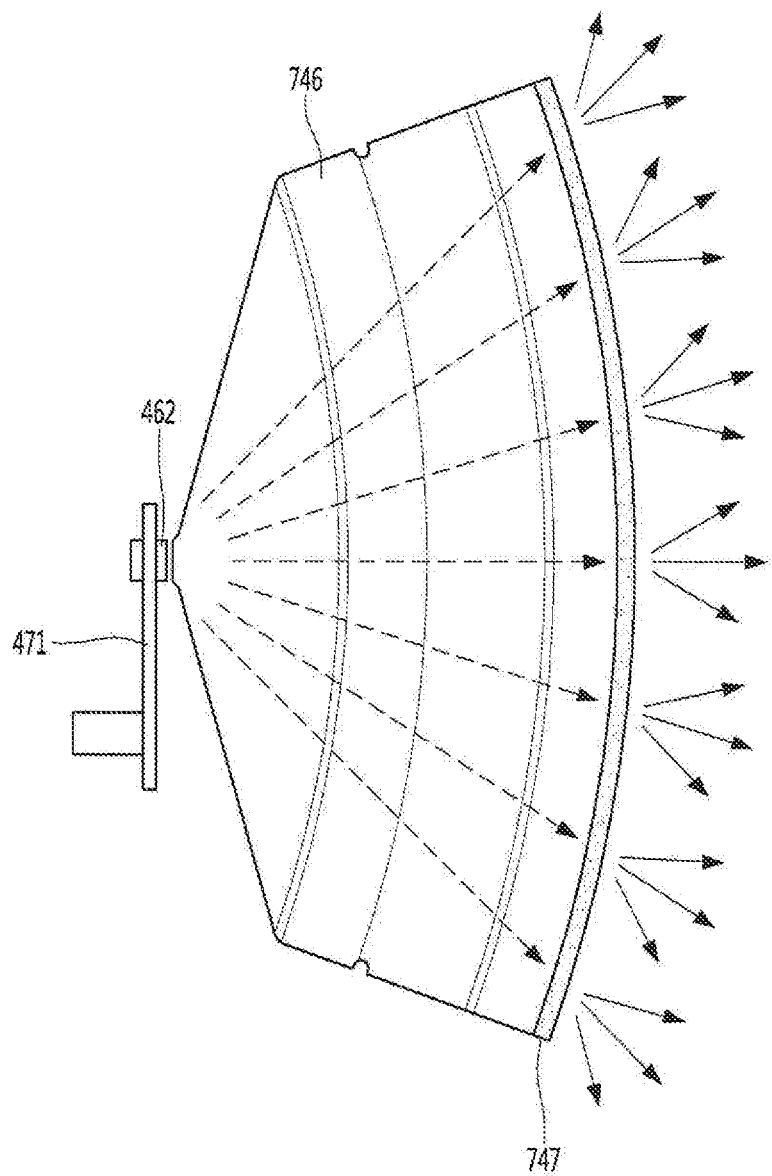
FIG. 17 is a view illustrating a state in which the light emitted from the light source is transferred toward outside of the air cleaner according to another embodiment.

FIG. 17 is a view illustrating a state in which the light emitted from the light source is transferred toward the outside of the air cleaner, with respect to the diffusion portion according to an embodiment.

FIG. 17 is a view illustrating the diffusion portion according to an embodiment. That is, the display device according to another embodiment may include lighting PCB 472, on which the light source 462 may be installed or provided, and diffusion portion 746, which may be disposed or provided to or at the outside of the light source 462 and transmit the light. Repetitive description of the disposition of the light source, the lighting PCB, and the diffusion portion has been omitted, as it is the same or similar as the embodiment described in FIG. 16.

The diffusion portion 746 may be made of transparent material. The transparent material may include acrylonitrile butadiene styrene (ABS) material.

The diffusion portion 746 may extend from the light source 462 toward the outside in the radial direction and a cross-sectional area of the diffusion portion 746 may gradually increased to the outside in the radial direction. A thickness of the diffusion portion 746 may be gradually decreased from the light source 462 in the radial direction.

The display device may include a diffusion sheet 747, which may be provided on an outer circumferential surface of the diffusion portion 746 and which may be uniformly displayed by scattering the light which passes through the diffusion portion 746. The diffusion sheet 747 may form the display portion 463.

The diffusion sheet 747 may be made of translucent material or opaque material. For example, the diffusion sheet 744 may be configured by Polyethylene phthalate (PET) or polycarbonate material. The light (dash line arrow), which may be transmitted through the diffusion portion 746 made of transparent material may be uniformly displayed by being scattered while passing through the diffusion sheet 747. Finally, when a user looks at the display device from the outside of the air cleaner 10, the user may recognize emission of subtle or soft light, and thus, user convenience may be improved.

With reference to FIG. 2 and FIG. 3, the second blowing device 200 will be described hereinafter.

The second blowing device 200 may include a lever device and a supporting device or support, which may be provided on or at an upper side of the lever supporting device 560. As the lever device and the supporting device are the same as or similar to the lever device 142 and the supporting device 140 of the first blowing device 100, repetitive disclosure has been omitted.

The second blowing device 200 may include a second filter member or filter 220, the second filter frame 230, the second fan housing 250, the second fan 260, and the fan motor 265. As these components are the same or similar to the first filter 120, the first filter frame 130, the first fan housing 150, the first fan 160, and the first fan motor 165, which are provided in the first blowing device 100, repetitive disclosure has been omitted.

The second blowing device 200 may include a third air guide device or guide 270 that guides a flow of air having passed through the second fan 260 by being coupled to an upper side of the second fan 260. As the third air guide 270 is the same as or similar to the first air guide 170, repetitive disclosure has been omitted.

The third air guide 270 may include a guide device or guide that guide a movement of the flow adjusting device 300. The guide may include a first rack and a shaft guide groove. The second blowing device 200 may include a second discharge guide device or guide 280, which may be installed or provided to or at an upper side of the third air guide 270 and guide a flow of air having passed through the third air guide 270.

The flow adjusting device 300 may be movable on an upper side of the second discharge guide 280. The flow adjusting device 300 may include a third fan 330. The third fan 330 may guide discharge air which passes through the third air guide 270 outside of the air cleaner 10. A third fan motor 335 may be coupled to the third fan 330.

The third fan 330 may include an axial flow fan. That is, the third fan 330 may be operated in order to axially discharge air which is axially introduced by passing through the third air guide 270. The air passing through the third fan 330 may be discharged through the second discharge portion 305, which may be positioned on or at an upper side of the third fan 330 to the outside.

In the air cleaner 10, a discharging blowing amount may be improved and air discharged in various directions, as the second discharge portion 305 along with the first discharge portion 105 of the first blowing device 100 may be provided.

A display device or display 600, on which operating information of the air cleaner 10 may be displayed, may be provided on an upper surface of the air cleaner 10. The display device 600 may include a display PCB 618. The display PCB 618 may be installed or provided in a space between the upper surface of the air cleaner 10 and the third fan 330.

The first fan motor 165 and the second fan motor 265 may be disposed or provided in series relative to a longitudinal direction of the air cleaner 10. The second fan motor 265 and the third fan motor 335 may be disposed or provided in series relative to the longitudinal direction of the air cleaner 10.

The flow adjusting device 300 may further include a rotation guide device or guide that guides rotation in the lateral direction and rotation in the vertical direction of the flow adjusting device 300. The rotation in the lateral direction may be referred to as a "first direction rotation" and the rotation in the vertical direction may be referred to as a "second direction rotation".

The rotation guide device may include a first guide mechanism or guide that guides the first direction rotation of the flow adjusting device 300 and a second guide mechanism or guide that guides the second direction rotation of the flow adjusting device 300. The first guide may include a first gear motor 363 that generates a drive force and a first gear 360, which may be rotatably coupled to the first gear motor 363 to be rotatable. For example, the first gear motor 363 may include a step motor a rotation angle of which may be easily controlled.

The second guide may include a rotating guide member or guide 370 (see FIG. 18) that guides rotation in the second direction of the flow adjusting device 300. The rotating guide 370 may include a rack 374.

The second guide may include a second gear motor 367 that generates a drive force and a second gear 365, which may be coupled to the second gear motor 367. For example, the second gear motor 367 may be a step motor. When the second gear motor 367 is driven, the rotation guide 370 may rotate in the vertical direction by linkage of the second gear 365 and the second rack 374. Accordingly, the flow adjusting device 300 may perform rotation in the second direction according to the movement of the rotation guide 370.

Figure 18:
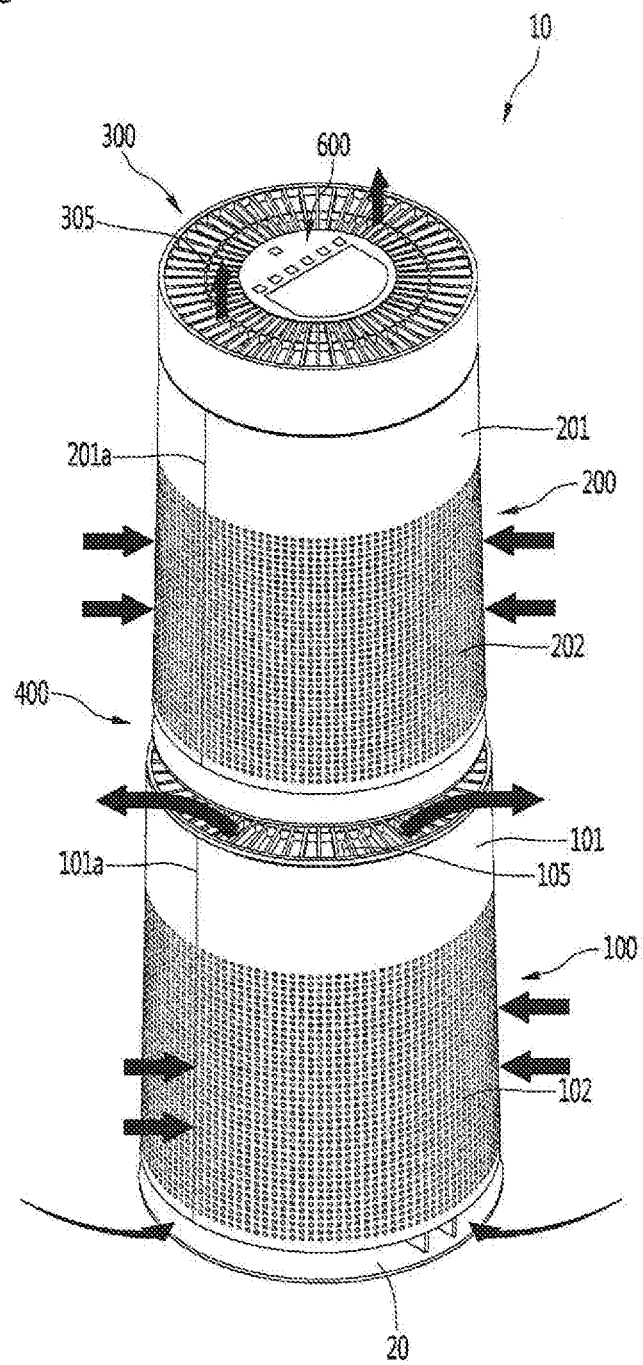
FIG. 18 to FIG. 20 are views illustrating an air flow state in the air cleaner of FIG. 1.

When the flow adjusting device 300 rotates in the second direction, the flow adjusting device may in a "second position" at which it projects from the upper surface of the air cleaner 10 (see FIG. 18). In contrast, as illustrated in FIG. 3, a position in which the flow adjusting device 300 is laid out may be referred to as a "first position".

FIG. 18 to FIG. 20 are views illustrating an air flow state in the air cleaner of FIG. 1.

First, a flow of air according to operation of the first blowing device 100 is described hereinafter. When the first fan 160 is driven, indoor air is suctioned into the inside of the first case 101 through the first suction portion 102 and the base suction portion 103. The suctioned air passes through the first filter 120 and foreign materials in the air may be filtered in this process. In the process of the air passing through the first filter 120, air may be suctioned in a radial direction of the first filter 120, filtered, and then flow in the upward direction.

The air which has passed through the first filter member 120 may flow to the upper side in the radial direction while passing through the first fan 160 and stably flow in the upward direction while passing through the first air guide 170 and the second air guide 180. Air passing through the first air guide 170 and the second air guide 180 may pass by the first discharge guide 190 and flow in the upward direction through the first discharge portion 105. Air which is discharged through the first discharge portion 105 may be guided by the dividing plate 430 which may be positioned at an upper side of the first discharge guide 190, and thus, may be discharged outside of the air cleaner 10.

In particular, a direction of the air which flows in the upward direction may be changed to the outside in the radial direction while flowing along the curved surface portion 444a and the straight surface portion 444b, which may be provided on the first plate 440 of the dividing plate 430. As the outermost portion in the radial direction of the dividing plate 430 is located outward of the outermost portion of the flow path of air discharged through the first discharge portion 105, it is possible to prevent the air discharged from the first discharge portion 105 from flowing in the upward direction, and air discharged in the radial direction may be effectively guided.

When the second fan 260 is driven, indoor air may be suctioned into the inside of the second case 201 through the second suction portion 202, The suctioned air may pass through the second filter 220, and in this process, foreign materials in the air may be filtered. In the process of the air passing through the second filter 220, air may be suctioned in the radial direction of the first filter 120, filtered, and then flow in the upward direction.

Air having passed through the second filter 220 may flow to the upper side in the radial direction while passing through the second fan 160, and stably flow in the upward direction while passing through the third air guide 270 and the second discharge guide 280. Air having passes through the third air guide 270 and the second discharge guide 280 may be discharged through the second discharge portion 305 via the flow adjusting device 300.

If the flow adjusting device 300 is in the first position in which the flow adjusting 300 is laid out, as shown in FIGS. 16 and 17, air which is discharged from the flow adjusting device 300 flows in the upward direction. On the other hand, if the flow adjusting device 300 is in the second position in which the flowing adjusting device 300 is inclined, as shown in FIG. 18, air which is discharged from the flow adjusting device 300 may flow toward the front upper side. By the flow adjusting device 300, an amount of air which is discharged from the air cleaner 10 may be increased, and purified air may be supplied to a position a far distant from the air cleaner 10.

According to embodiments disclosed herein, a suction capacity may be improved as the suction portion may be formed along an outer circumferential surface of a cylindrical case and a structural resistance of the case may not be generated in an air suction process. In particular, a plurality of apertures may be included on the suction portion and a suction flow path, which may be directed to the inside portion of the air cleaner, may be formed in 360 degree directions relative to the air cleaner, as the plurality of apertures may be formed evenly over an entire outer circumferential surface of the case. Finally, a suction area of air may be increased and air around a person in a room may be sufficiently suctioned where the person in the room sitting down or standing up.

Discharge of air in the upward direction may be guided through the second blowing device and a discharge of air in the frontward direction may be guided by the flow adjusting device, which may be provided on the upper side of the second blowing device. Discharge of air in the lateral direction may be guided, in a process of rotating of the flow adjusting device. Finally, an air cleaning function of the indoor space may be improved as discharge of air in various directions is guided relative to the air cleaner and a discharging air flow may be formed to extend a long distance from the air cleaner. A discharge air flow may be easily generated toward a circumferential space of a person in the room whether the person in the room sitting down or standing up.

As the second blowing device may be disposed or provided on the upper side of the first blowing device, a dividing plate may be provided between the first blowing device and the second blowing device, and the air which is discharged from the first blowing device is capable of being guided to the outside in the radial direction by the dividing plate, air which is discharged from the first blowing device may be prevented from being re-introduced to the second blowing device.

The discharging flow path which passes through the first discharge guide of the first blowing device may extend in the upward direction and the dividing plate may extend sufficiently long to the outside in the radial direction at the upper side of the discharging flow path, and thus, the air in the discharge flow path may be prevented from being introduced to the second blowing device through the dividing plate. That is, as the circumferential surface of the dividing plate further extends to the outside in the radial direction than the outside path of the discharge flow path, the air which passes through the discharge flow path may be guided by the dividing plate, and thus, is capable of easily flowing in the outside direction of the air cleaner.

As the display device is provided, and thus, the information related to operation of the air cleaner is capable of being displayed, an operation of the air cleaner may easily be recognized by the user. In particular, the information related to the operation of the air cleaner may include information related to an air cleanliness degree in the indoor space, and thus, the user may control the operation of the air cleaner, based on the information related to the air cleanliness degree, which may be displayed on the display device. For example, when the air cleanliness degree in the indoor space is relatively reduced, the user may increase a blowing amount of the air cleaner and when the air cleanliness degree in the indoor space is relatively increased, the user may decrease the blowing amount of the air cleaner.

According to the operation of the air cleaner, as the user may confirm a state in which the air cleanliness degree in the indoor space is improved through the display device, reliability of the air cleaner may be improved. Further, as the display device is installed or provided inside of the dividing plate, and thus, does not required an additional space for installing the display device, space utilization of the air cleaner may be improved.

As the display portion, which may be provided in the display device may be provided in a space between a first plate and a second plate of the dividing plate and extends lengthwise along the outer circumferential surface of the dividing plate, a large or wide space for providing the display portion is not required. For example, the display portion may be displayed with a line having a predetermined thickness. In addition, the display portion may be capable of Implementing a predetermined color which indicates the air cleanliness degree in the indoor space, and the user may intuitively recognize the air cleanliness degree through the color. Finally, as it is not necessary to display letters, numbers, or figures, for example, to display information on the display portion, the configuration of the display portion may be compact.

As a light emitting diode (LED) is included in a light source which is provided in the display device, it is possible to implement various colors. As a diffusion portion or diffuser made of translucent material which is capable of subtly implementing light emitted from the light source is provided in the outside of the light source, recognition by the user through the displaying portion may be conveniently performed.

As a reflecting sheet is provided in the upper side or the lower side of the diffusion portion, and thus, light emitted from the light source is collected in the diffusion portion, an intensity of color through the diffusion portion is prevented from weakening. A blowing capacity of the air cleaner may be improved as the plurality of blowing devices may be provided.

The air which flows in the radial direction through the centrifugal fan may be easily guided toward the discharge portion in the upward direction, as the centrifugal fan for increasing the blowing capacity of the air cleaner and the air guide device which is disposed on or at an outlet side of the centrifugal fan may be provided.

Further, interference between the air flows may be prevented as the air flows which are independent from each other may be generated through the first blowing device and the second blowing device. Accordingly, an air flowing capacity may be improved.

A suction area may be increased as air may be introduced inside of the filter from all directions outside of the filter by the filter being provided in a cylindrical shape. Accordingly, an air cleaning capacity of the filter may be improved.

Embodiments disclosed herein provide an air cleaner which is capable improving a suction capacity of air which is suctioned to the air cleaner. Embodiments disclosed herein further provide an air cleaner which is capable of sufficiently suctioning air around a person in a room whether the person in the room is sitting down or standing up by including a suction flow path which is directed from a circumferential direction of the air cleaner to an inside portion thereof and a suction flow path through which air is introduced through an upper portion and a lower portion of the air cleaner.

Embodiments disclosed herein provide an air cleaner which is capable of discharging air from the air cleaner in various directions and sending the discharged air a long distance. Embodiments disclosed herein provide an air cleaner which is capable of easily discharging air toward a surrounding space of a person in a room whether the person in the room sitting down or standing up by a discharge air flow being easily generated in an upward direction, a frontward direction, and lateral directions of the air cleaner.

Embodiments disclosed herein provide an air cleaner which includes a display device or display which is capable of displaying information related to an operation of the air cleaner, and thus, a user may be capable of intuitively recognizing the information. Embodiments disclosed herein provide an air cleaner which does not require an additional space for installing the display device by proposing an optimal position related to the installation of the display device.

Embodiments disclosed herein provide an air cleaner which is capable of easily guiding air which is discharged from the air cleaner outside of the air cleaner and preventing the discharged air from being reintroduced to the air cleaner. Embodiments disclosed herein provide an air cleaner a blowing capacity of which may be increased.

Embodiments disclosed herein provide an air cleaner in which an air guide device or guide is provide which allows air passing through a centrifugal fan to be capable of easily flowing toward a discharge portion in an upward direction in a case of adopting a centrifugal fan in order to increase a blowing capacity. Embodiments disclosed herein also provide an air cleaner which improves a purification capacity of a filter and in which replacement of the filter may easily be performed. Embodiments disclosed herein provide an air cleaner in which a filter may be easily installed without an installation space for installing the filter in the inside portion of an air cleaner being additionally provided.

Embodiments disclosed herein provide an air cleaner that may include a first air cleaning module in which a first fan that generates an air flow from a first suction portion or inlet toward a first discharge portion or outlet may be provided; a second air cleaning module in which a second fan that generates air flow from a second suction portion or inlet toward a second discharge portion or outlet may be provided; a dividing plate which may be disposed between the first air cleaning module and the second air cleaning module; and a display device or display, which may be disposed or provided on or at an inside portion of the dividing plate and in which a light source may be provided.

The display device may include a display portion, which may be provided on at least a portion of an outer circumferential surface of the dividing plate and which displays information related to an operation of the air cleaner. The display device may further include a diffusion portion or diffuser, which may transfer the light emitted from the light source to the display portion. The dividing plate may include a first plate and a second plate, which may be coupled to an upper side of the first plate. The diffusion portion may be disposed or provided between the first plate and the second plate.

The air cleaner may further include a sheet supporting portion or support, which may project from the first plate or the second plate and support the diffusion portion. The display may be formed on an end portion or end of the diffusion portion.

The display device may include a lighting PCB, on which the light source may be mounted, and a PCB case, to which the lighting PCB may be coupled. The PCB case may be slid and coupled to the first plate.

The diffusion portion may be made of ABS, which is transparent material. The display device may further include a diffusion sheet, which may be provided in the diffusion portion and scatter the light transmitting through the diffusion portion.

The diffusion portion may be made of acrylic or polymethyl methacrylate resin (PMMA), which is a translucent material. The display device may further include reflecting sheets, which may be provided to or at an upper side and a lower side of the diffusion portion and reflect the light emitted from the light source to the diffusion portion.

A lighting support portion or support including a mounting groove, into which the light source may be inserted, may be included in a space between the first plate and the second plate.

The diffusion portion may extend from the light source toward the display portion in the radial direction. A cross-sectional area of the diffusion portion may gradually increase in the radial direction. A thickness of the diffusion portion may gradually decrease from the light source in the radial direction.

The information related to the operation of the air cleaner may include information related to an air cleanliness degree in the indoor space.

The light source may be implemented various colors in order to indicate a level of the air cleanliness degree in the indoor space and then display the level. The light source may include a LED.

The dividing plate may be disposed or provided to or at an upper side of the first discharge portion of the first air cleaning module, and thus, guide the air which is discharged from the first discharge portion to the outside in the radial direction.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner, comprising:
a first air cleaning module including a first fan, and a first discharge outlet through which air is discharged from the first air cleaning module;
a second air cleaning module including a second fan, and a second discharge outlet through which air is discharged from the second air cleaning module;
an air guide provided between the first air cleaning module and the second air cleaning module, wherein the air guide includes an upper guide and a lower guide, wherein a space between the upper guide and the lower guide forms a diffuser for at least one light emitting diode (LED).

2. The air cleaner according to claim 1, wherein an outlet of the diffuser is provided at an outer circumferential surface of the air guide.

3. The air cleaner according to claim 2, wherein the outlet of the diffuser forms a display that provides an indication of predetermined information.

4. The air cleaner according to claim 3, wherein the predetermined information is related to an operation of the air cleaner.

5. The air cleaner according to claim 4, wherein the predetermined information related to the operation of the air cleaner includes information related to an air cleanliness degree in an indoor space.

6. The air cleaner according to claim 5, wherein the at least one LED outputs a plurality of colors in order to indicate a level of air cleanliness degree in the indoor space and thus display the level.

7. The air cleaner according to claim 1, wherein the upper guide and the lower guide include a first plate and a second plate, respectively.

8. The air cleaner according to claim 1, wherein the diffuser includes a transparent material.

9. The air cleaner according to claim 8, further including:
a support that projects from the first guide or the second guide and supports the transparent material.

10. The air cleaner according to claim 8, wherein the transparent material is at least one of acryolinitrile butadiene styrene (ABS), acrylic, or polymethyl methacrylate resin (PMMA).

11. The air cleaner according to claim 8, wherein the diffuser further includes at last one reflecting sheet provided at at least one of an upper side or a lower side of the transparent sheet, the at least one reflecting sheet reflecting the light emitted from the at least one LED to the diffuser.

12. The air cleaner according to claim 8, wherein the diffuser further includes a diffusion sheet provided at an outer circumferential surface of the transparent material, the diffusion sheet scattering the light transmitted through the diffuser.

13. The air cleaner according to claim 1, further including a PCB on which the at least one LCD is mounted and a PCB case to which the PCB is coupled.

14. The air cleaner according to claim 13, wherein the PCB case is slidingly coupled to the lower guide.

15. The air cleaner according to claim 1, further including a support including a mounting groove in which the at least one LED is inserted, the support being provided between the first guide and the second guide.

16. The air cleaner according to claim 1, wherein the diffuser extends from the at least one LED toward an outer circumferential surface of the air guide in a radial direction, and wherein a cross-sectional area of the diffuser gradually increases in the radial direction.

17. The air cleaner according to claim 16, wherein a thickness of the diffuser gradually decreases as it extends from the at least one LED in the radial direction.

18. The air cleaner according to claim 1, wherein the air guide includes a dividing plate provided at an upper side of the first discharge outlet of the first air cleaning module and thus guides the air which is discharged from the first discharge outlet to the outside of the air cleaner in the radial direction.

* * * * *